United States Patent
Futaki

(10) Patent No.: US 10,887,793 B2
(45) Date of Patent: Jan. 5, 2021

(54) RADIO STATION, RADIO TERMINAL APPARATUS, AND METHOD FOR THESE

(71) Applicant: NEC Corporation, Tok (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/552,545

(22) PCT Filed: Dec. 24, 2015

(86) PCT No.: PCT/JP2015/006428
§ 371 (c)(1),
(2) Date: Aug. 22, 2017

(87) PCT Pub. No.: WO2016/142978
PCT Pub. Date: Sep. 15, 2016

(65) Prior Publication Data
US 2018/0035329 A1 Feb. 1, 2018

(30) Foreign Application Priority Data

Mar. 6, 2015 (JP) .................................. 2015-045125

(51) Int. Cl.
*H04W 28/06* (2009.01)
*H04W 72/12* (2009.01)
(Continued)

(52) U.S. Cl.
CPC ....... *H04W 28/06* (2013.01); *H04W 72/0446* (2013.01); *H04W 72/0453* (2013.01);
(Continued)

(58) Field of Classification Search
CPC .......................... H04W 28/06; H04W 72/0446
See application file for complete search history.

(56) References Cited

U.S. PATENT DOCUMENTS 7,978,626 B1  7/2011 Khanka et al.
10,178,700 B2  1/2019 Eriksson et al.
(Continued)

FOREIGN PATENT DOCUMENTS

EP  2 816 858 A1  12/2014
WO  2006/134830 A1  12/2006

OTHER PUBLICATIONS

Lähetkangas, Eeva et al., "On the TDD Subframe Structure for Beyond 4G Radio Access Network", Future Network & MobileSummit 2013 Conference Proceedings, Paul Cunningham and Miriam Cunningham (Eds), IIMC International Information Management Corporation, 2013, pp. 1-10.

(Continued)

*Primary Examiner* — Parth Patel
(74) *Attorney, Agent, or Firm* — Sughrue Mion, PLLC

(57) ABSTRACT

A radio station (3) is configured to perform, with at least one radio terminal (1, 2), first radio communication in accordance with a first transmission time interval (TTI) and second radio communication in accordance with a second TTI. The first TTI is equal to a duration of one subframe (410, 510). The second TTI is shorter than the duration of the subframe (410, 510). The radio station (3) is configured to receive assistance information (802, 904) regarding the second radio communication from the radio terminal (2) capable of performing the second radio communication or from a higher network node (4).

20 Claims, 18 Drawing Sheets

(51) Int. Cl.
*H04W 72/04* (2009.01)
*H04W 92/18* (2009.01)
*H04W 84/04* (2009.01)
*H04W 88/02* (2009.01)

(52) U.S. Cl.
CPC .... *H04W 72/1242* (2013.01); *H04W 72/1278* (2013.01); *H04W 84/042* (2013.01); *H04W 88/02* (2013.01); *H04W 92/18* (2013.01)

(56) References Cited

U.S. PATENT DOCUMENTS

| | | | |
|---|---|---|---|
| 2005/0249120 A1* | 11/2005 | Heo | H04L 1/0007 370/236 |
| 2008/0049690 A1 | 2/2008 | Kuchibhotla et al. | |
| 2011/0141991 A1 | 6/2011 | Gao | |
| 2012/0093257 A1* | 4/2012 | Sawahashi | H04L 1/0007 375/295 |
| 2013/0051358 A1* | 2/2013 | Turtinen | H04W 74/0816 370/330 |
| 2013/0114515 A1 | 5/2013 | Koo et al. | |
| 2013/0114516 A1 | 5/2013 | Koo et al. | |
| 2013/0194985 A1 | 8/2013 | Zetterman et al. | |
| 2013/0250828 A1* | 9/2013 | Chou | H04W 72/0413 370/311 |
| 2014/0044206 A1* | 2/2014 | Nammi | H04B 7/0417 375/267 |
| 2014/0071915 A1* | 3/2014 | Papasakellariou | H04L 5/0053 370/329 |
| 2014/0148179 A1* | 5/2014 | Das | H04B 1/7107 455/452.1 |
| 2015/0105062 A1* | 4/2015 | Quan | H04W 8/24 455/418 |
| 2015/0172005 A1* | 6/2015 | Lohr | H04L 1/0006 370/329 |
| 2015/0189574 A1 | 7/2015 | Ng et al. | |
| 2015/0236822 A1 | 8/2015 | Pirskanen et al. | |
| 2015/0271798 A1 | 9/2015 | Chen et al. | |
| 2015/0334686 A1* | 11/2015 | Ji | H04W 72/1257 370/280 |
| 2015/0334702 A1* | 11/2015 | Ji | H04W 72/1257 370/280 |
| 2015/0334729 A1* | 11/2015 | Ji | H04W 72/0453 370/336 |
| 2015/0358924 A1* | 12/2015 | Papasakellariou | H04W 52/346 370/329 |
| 2016/0044552 A1* | 2/2016 | Heo | H04L 5/001 370/331 |
| 2016/0044678 A1* | 2/2016 | Kwon | H04W 76/14 370/329 |
| 2016/0080969 A1* | 3/2016 | Tseng | H04W 4/70 370/329 |
| 2016/0081004 A1 | 3/2016 | Cai et al. | |
| 2016/0227571 A1 | 8/2016 | Baek et al. | |
| 2016/0278025 A1 | 9/2016 | Wang et al. | |
| 2017/0063513 A1* | 3/2017 | Nammi | H04L 5/0073 |
| 2017/0171853 A1* | 6/2017 | Lindoff | H04W 48/16 |
| 2017/0208614 A1* | 7/2017 | Xia | H04W 72/12 |
| 2017/0290008 A1* | 10/2017 | Tooher | H04L 1/0007 |
| 2018/0006790 A1 | 1/2018 | Park et al. | |
| 2018/0035430 A1* | 2/2018 | Futaki | H04W 72/04 |
| 2018/0049188 A1* | 2/2018 | Kim | H04W 24/10 |

OTHER PUBLICATIONS

Renesas Mobile Europe LTD, "Support of concurrent 2ms and 10ms TTI in a cell", 3GPP TSG-RAN WG2 Meeting #75bis R2-115272, Oct. 10-14, 2011, Zhuhai, China, 3 pages.
Ericsson, "Study on Latency reduction techniques for LTE", 3GPP RP-150310, Mar. 3, 2015, pp. 1-6.
International Search Report of PCT/JP2015/006428 dated Mar. 22, 2016 [PCT/ISA/210].
Office Action dated Oct. 29, 2020, from the United States Patent and Trademark Office in U.S. Appl. No. 16/855,327.

* cited by examiner

RADIO STATION, RADIO TERMINAL APPARATUS, AND METHOD FOR THESE

CROSS REFERENCE TO RELATED APPLICATIONS

This application is a National Stage of International Application No. PCT/JP2015/006428, filed Dec. 24, 2015, claiming priority based on Japanese Patent Application No. 2015-045125, filed Mar. 6, 2015, the contents of all of which are incorporated herein by reference in their entirety.

TECHNICAL FIELD

The present disclosure relates to radio communication and, in particular, to allocation and use of a plurality of time-frequency resources.

BACKGROUND ART

As next-generation radio communication technology beyond 4G (Long Term Evolution (LTE)-Advanced), 5G has been attracting attention. Various studies on 5G including use cases and requirements for 5G have been started. Reduction in access latency (Latency Reduction) is drawing attention as a major requirement for 5G. Examples of access latency includes: a time required for radio terminal (User Equipment (UE)) to complete transmission of data to a radio base station (eNodeB (eNB)); a time required for a UE to complete transmission of data to an external network (e.g., application server); a time required for a UE to complete transmission of data to another UE; or a time required for a UE to establish preparation for transmitting data. In the present specification, a time period from when a radio terminal (UE) requests a grant for transmission of uplink (UL) data from a radio base station (eNB) until when the UE completes the transmission of the UL data to the radio base station (eNB) is used as an example of the access latency. Further, radio communication in which some kind of access latency is reduced as compared to existing radio communication (e.g., LTE and LTE-Advanced) is collectively referred to as "low latency access".

Non Patent Literature 1 discloses a Time Division Duplex (TDD) system (hereinafter referred to as B4G TDD) where both uplink (UL) and downlink (DL) exist within one subframe in order to achieve low latency access. In B4G TDD, for example, a request for UL radio resources from an UE (i.e., Scheduling Request (SR)), transmission of assignment information of the UL radio resources from an eNB (i.e., Scheduling Grant (SG)) in response to the request, and transmission of UL data in accordance with the SG are performed within one subframe. If the UL data is successfully received by the eNB in one transmission, access latency (in this case, the access latency is assumed to be a time period from when the UE transmits the SR to the eNB until when the UE completes the transmission of the UL data) is reduced from about 10 millisecond (ms), which has been required before, to a subframe length (e.g., 1 ms). Non Patent Literature 1 also discloses using a subframe length (e.g., 0.25 ms) that is shorter than the subframe length (i.e., 1 ms) of LTE and LTE-Advanced. This contributes to further reduction of the access latency.

CITATION LIST

Patent Literature

Patent Literature 1: United States Patent Application Publication No. 2008/0049690

Non Patent Literature

Non Patent Literature 1: Lahetkangas et al., "On the TDD Subframe Structure for Beyond 4G Radio Access Network", Future Network and Mobile Summit (FutureNetworkSummit), July 2013

SUMMARY OF INVENTION

Technical Problem

There is a problem in B4G TDD disclosed in Non Patent Literature 1 that it has no backward compatibility with existing LTE and LTE Advanced systems. 5G systems may be required to communicate not only with new UEs supporting low latency access but also with legacy UEs not supporting low latency access (e.g., UEs supporting only existing LTE and LTE-Advanced). As the subframe structure of B4G TDD differs from those of existing LTE and LTE-Advanced subframes, it is difficult for B4G TDD systems to communicate with the legacy UEs.

Note that the subframe is composed of a plurality of time-frequency resources and has a predetermined duration. The duration of one subframe (hereinafter referred to as "subframe duration") means a length of time over which a subframe continues or lasts. The subframe duration is commonly the same as a Transmission Time Interval (TTI) which data transmission and data reception by a UE should be performed in accordance with. The TTI is defined as a length of time (time length) over which one transport block and error detection bits added thereto are transmitted. The transport block is a data unit (i.e., MAC Protocol Data Unit (PDU)) passed from the Medium Access Control (MAC) layer to the physical layer. In the physical layer of the transmitter, the entire transport block is used to calculate error detection bits (e.g., Cyclic Redundancy Check (CRC) parity bits) and these calculated error detection bits are added to the transport block. Channel coding in the physical layer is performed on the transport block to which the error detection bits have been added. Further, in the physical layer processing in the transmitter, interleaving is performed on the coded bit sequence generated from one transport block. Accordingly, the receiver needs to receive at least one TTI data (i.e., data corresponding to the transport block and the error detection bits added thereto) in order for the receiver to be able to perform deinterleaving and decoding.

The present inventor has conducted a study about data transmission where although a new UE supporting the low latency access (hereinafter referred to as a non-legacy UE) and a UE not supporting the low latency access use the same subframe, the new UE and the legacy UE perform data transmission or reception in accordance with different TTIs. Patent Literature 1 discloses that a first plurality of time-frequency resources having a length (duration) of 1 ms in a single 1 ms subframe are allocated to a first UE, and at the same time, a second plurality of time-frequency resources having a length (duration) of 0.5 ms in this subframe are allocated to a second UE. Here, the duration of the first (or second) time-frequency resources means a length of time (time length) over which the first (or second) time-frequency resources continue or last. However, in Patent Literature 1, the first and second UEs use the same TTI (1 ms).

The low latency access may cause a reduction in utilization efficiency of radio resources. For example, if a UE repeatedly transmits SRs and repeatedly receives UL grants (scheduling grants) to complete uplink transmission, this situation increases access latency. Therefore, in order to reduce access latency, it is preferable that data transmission be completed by a small number of transmission. On the other hand, if a radio base station assigns excessive UL resources to a UE for low latency access, this situation may cause useless waste of UL radio resources.

Moreover, it is preferable that a time interval from the UL grant to the UL transmission for low latency access be shorter than that of normal access. For example, in normal Frequency Division Duplex (FDD) LTE, a UL grant for UL transmission is issued at a subframe (i.e., subframe #(n−4)), which is four subframes prior to the subframe (i.e., subframe # n) in which this UL transmission is performed. On the other hand, in low latency access, a UL grant may be issued one or two subframes prior to the subframe in which the UL transmission (subframe # n) is performed. In this case, the radio base station must transmit a UL grant for normal access performed in the subframe # n (i.e., at the subframe #(n−4)) before transmitting a UL grant for low latency access performed in the subframe # n (i.e., at the subframe #(n−1) or subframe #(n−2)). Therefore, the radio base station needs to reserve radio resources for low latency access when it issues a UL grant for normal access. However, if low latency access is not performed in the subframe # n, the reserved radio resources are likely unused.

As described above, the low latency access may cause a reduction in utilization efficiency of radio resources. In order to prevent the reduction in the utilization efficiency of radio resources, a radio base station may need sufficient information to determine a grant of low latency access or to determine resource assignment for low latency access.

One of objects to be attained by embodiments disclosed in the present specification is to provide an apparatus, a method, and a program that contribute to preventing a reduction in the utilization efficiency of the radio resources caused by the low latency access. Note that this object is only one of the objects to be attained by the embodiments disclosed herein. The other objects or problems and novel features will be made apparent from the following description and the accompanying drawings.

Solution to Problem

In a first aspect, a radio station includes at least one radio transceiver and at least one processor. The at least one processor is configured to perform, with at least one radio terminal, first radio communication in accordance with a first transmission time interval (TTI) and second radio communication in accordance with a second TTI. The first TTI is equal to a duration of one subframe. The second TTI is shorter than the duration of the subframe. The at least one processor is configured to receive assistance information regarding the second radio communication from a first radio terminal capable of performing the second radio communication among the at least one radio terminal or from a higher network node.

In a second aspect, a radio terminal apparatus includes at least one radio transceiver and at least one processor. The at least one radio transceiver is configured to communicate with a radio station. The at least one processor is configured to perform both first radio communication in accordance with a first transmission time interval (TTI) that is equal to a duration of a subframe and second radio communication in accordance with a second TTI that is shorter than the first TTI or to perform the second radio communication. The at least one processor is configured to transmit assistance information regarding the second radio communication to the radio station.

In a third aspect, a method performed by a radio station is provided. The radio station is configured to perform, with at least one radio terminal, first radio communication in accordance with a first transmission time interval (TTI) and second radio communication in accordance with a second TTI. The first TTI is equal to a duration of one subframe, and the second TTI is shorter than the duration of the subframe. The method according to this aspect includes receiving assistance information regarding the second radio communication from a first radio terminal capable of performing the second radio communication among the at least one radio terminal or from a higher network node.

In a fourth aspect, a method performed by a radio terminal apparatus is provided. The radio terminal apparatus is configured to communicate with a radio station which is configured to perform, with at least one radio terminal, first radio communication in accordance with a first transmission time interval (TTI) that is equal to a duration of a subframe and second radio communication in accordance with a second TTI that is shorter than the first TTI. The method according to this aspect includes transmitting assistance information regarding the second radio communication to the radio station.

In a fifth aspect, a program includes instructions (software codes) that, when loaded into a computer, causes the computer to perform the method according to the above-described third or fourth aspect.

Advantageous Effects of Invention

According to the above aspects, it is possible to provide an apparatus, a method, and a program that contribute to preventing a reduction in utilization of radio resources caused by low latency access.

DESCRIPTION OF EMBODIMENTS

Specific embodiments will be described hereinafter in detail with reference to the drawings. The same or corresponding elements are denoted by the same signs throughout the drawings, and repeated explanations will be omitted as necessary for the sake of clarity.

First Embodiment

Figure 1:
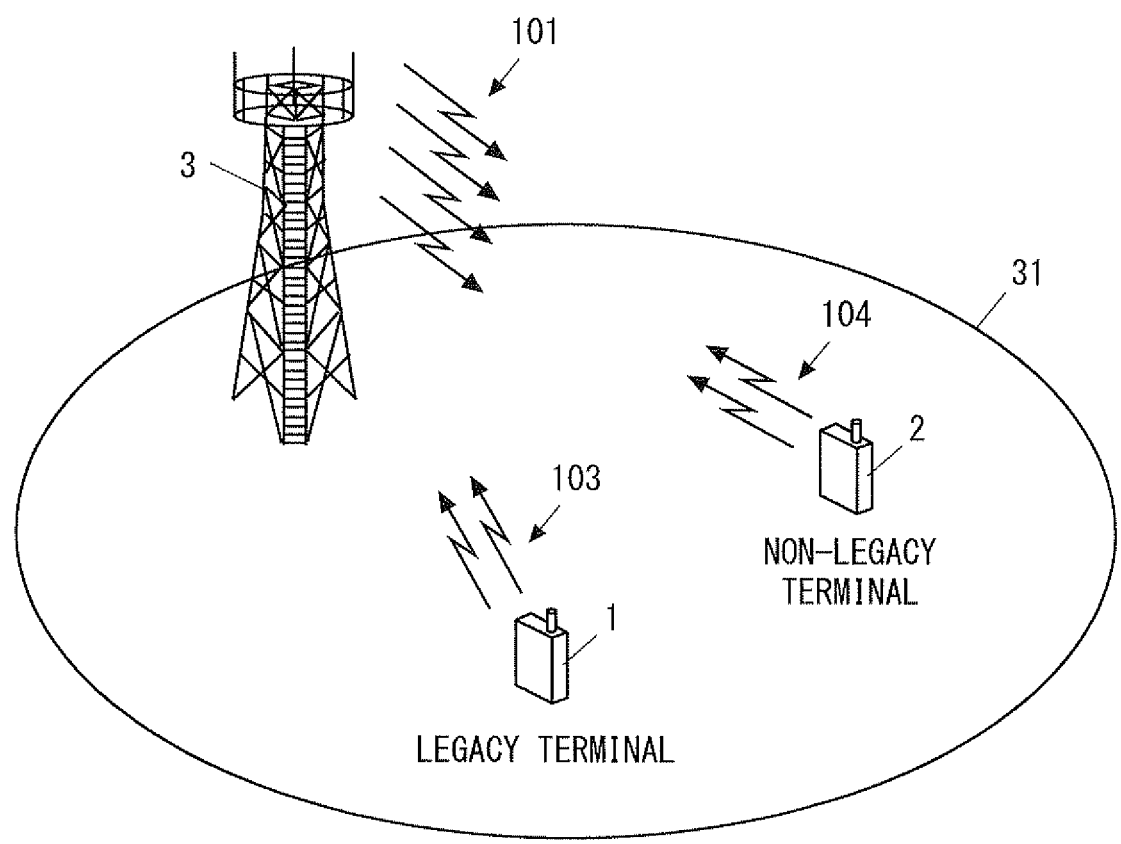
FIG. 1 is a diagram showing a configuration example of a radio communication system according to some embodiments.

FIG. 1 shows a configuration example of a radio communication system according to some embodiments including this embodiment. In the example of FIG. 1, the radio communication system includes a legacy radio terminal (UE) 1, a non-legacy radio terminal (UE) 2, and a radio base station (Base Station (BS)) 3. The BS 3 communicates with the legacy UE 1 and the non-legacy UE 2 in a cell 31. The BS 3 transmits downlink (DL) signals 101 using a downlink (DL) frequency band (DL system bandwidth) of the cell 31. In the case of LTE/LTE-Advanced, the BS 3 corresponds to an eNB. The BS 3 may include a control node having a radio resource management function and a radio transmission node. The control node is, for example, a Radio Network Controller (RNC) in Universal Mobile Telecommunications System (UMTS) or a Base Station Controller (BSC) in Global System for Mobile communications (GSM (registered trademark)) system. The radio transmission node is, for example, a NodeB in UMTS or a Base transceiver station (BTS) in GSM system. The BS 3 according to this embodiment can be referred to as a radio station.

The legacy UE 1 transmits uplink (UL) signals 103 to the BS 3 using an uplink frequency band (UL system bandwidth) of the cell 31. Likewise, the non-legacy UE 2 also transmits uplink (UL) signals 104 to the BS 3 using this UL system bandwidth. In a plurality of embodiments including this embodiment, the case of Frequency Division Duplex (FDD), in which the DL system bandwidth used for the DL signals 101 differs from the UL system bandwidth used for the UL signals 103 and 104, will be mainly used for the description. However, the embodiments including this embodiment can be applied to TDD.

As already described above, low latency access is radio communication in which some kind of access latency is reduced as compared with existing radio communication (i.e., normal access). In the embodiments including this embodiment, first access corresponding to the normal access and second access corresponding to the low latency access are used. The first access is defined as data transmission and reception performed in accordance with a first TTI (e.g., 1 ms). The second access is defined as data transmission and reception performed in accordance with a second TTI (e.g., 0.5 ms). The first TTI is equal to the duration of one subframe (i.e., DL subframe and UL subframe) used for transmitting the DL signals 101 and the UL signals 103 and 104. On the other hand, the second TTI is shorter than the first TTI and is thus shorter than the duration of one subframe (subframe duration). For example, the second TTI may be equal to the duration of one time slot among a plurality of time slots constituting the subframe or may be an integer multiple of a symbol length (but shorter than the subframe duration).

In some implementations, the first TTI may be the minimum unit of a transmission time allocated by a single scheduling grant to a UE that performs the first access. Similarly, the second TTI may be the minimum unit of a transmission time allocated by a single scheduling grant to a UE that performs the second access.

The legacy UE 1 does not support the second access and instead performs the first access. On the other hand, the non-legacy UE 2 supports the second access. The non-legacy UE 2 may only support the second access or may support both the first access and the second access. If the non-legacy UE 2 supports both the first access and the second access, the non-legacy UE 2 may use the second access, for example, when it performs data transmission or reception requiring low latency.

In some implementations, the first access (i.e., UL data transmission or DL data reception in accordance with the first TTI) and the second access (i.e., UL data transmission or DL data reception in accordance with the second TTI) may be performed within one subframe. In this case, the BS 3 performs both DL data transmission (or UL data reception) in accordance with the first TTI and DL data transmission (or UL data reception) in accordance with the second TTI within one subframe. In one example, the legacy UE 1 performs the first access and the non-legacy UE 2 performs the second access. In another example, one non-legacy UE 2 performs the first access and the same or different non-legacy UE 2 performs the second access.

In some implementations, the first access may be performed in one subframe and the second access may be performed in another subframe. In this case, in each subframe, the BS 3 performs either DL data transmission (or UL data reception) in accordance with the first TTI or DL data transmission (or UL data reception) in accordance with the second TTI. In a subframe where the first access is performed, the legacy UE 1 or both the legacy UE 1 and the non-legacy UE 2 perform UL data transmission or DL data reception. In a subframe where transmission in accordance with the second TTI is performed, the non-legacy UE 2 performs UL data transmission or DL data reception.

As has been described above, the subframe is composed of a plurality of time-frequency resources and has a predetermined duration. The duration of one subframe (i.e., subframe duration) means a length of time (time length) over which a subframe continues or lasts. Further, the TTI is defined as a length of time (time length) over which one transport block is transmitted. The transport block is a data unit (i.e., MAC PDU) passed from the Medium Access Control (MAC) layer to the physical layer. In the physical layer of the transmitter, the entire transport block is used to calculate error detection bits (e.g., CRC parity bits) and the calculated error detection bits are added to the transport block. Channel coding in the physical layer is performed on the transport block to which the error detection bits have been added. Further, in the physical layer processing in the transmitter, interleaving is performed on the coded bit sequence generated from one transport block. Accordingly, the receiver needs to receive at least one TTI data (i.e., data corresponding to the transport block and the error detection bits added thereto) in order for the receiver to be able to perform deinterleaving and decoding. In this description, the transmitter is the BS 3 in the case of DL transmission and is the legacy UE 1 and the non-legacy UE 2 in the case of UL transmission. On the other hand, the receiver is the legacy UE 1 and the non-legacy UE 2 in the case of DL reception and is the BS 3 in the case of UL reception.

Note that when Multiple Input/Multiple Output (MIMO) spatial multiplexing is used, a UE (legacy UE 1 or non-legacy UE 2) can transmit a plurality of transport blocks per subframe. For example, in LTE, a UE potentially transmits up to two transport blocks per subframe. That is, a UE potentially utilizes MIMO spatial multiplexing and thus performs transmission or reception of a plurality of layers through a plurality of antenna ports. However, it should be noted that even when MIMO spatial multiplexing is used, the TTI length for the transport block in each layer is the same as the TTI length when MIMO spatial multiplexing is not used.

In addition, when Carrier Aggregation (CA) in which a UE (legacy UE 1 or non-legacy UE 2) uses a plurality of carriers (Component Carriers (CCs)) simultaneously is performed, the transport block is generated for each carrier (i.e., for each cell). However, it should be noted that even when CA is performed, the TTI length for the transport block transmitted in each CC is the same as the TTI length when CA is not performed.

In some implementations, the transport blocks transmitted via the first access and the second access may be transport blocks that are used for a Data Radio Bearer (DRB) or a Signaling Radio Bearer (SRB) or both. In other words, these transport blocks may be transport blocks used to transmit either or both of user data (e.g., user Internet Protocol (IP) packets) and dedicated control signaling (e.g., Radio Resource Control (RRC) signaling). Specifically, the transport blocks transmitted via the first access and the second access may be Uplink Shared Channel (UL-SCH) transport blocks or Downlink Shared Channel (DL-SCH) transport blocks in LTE and LTE-Advanced. The UL-SCH transport blocks are used for transmitting UL user data (i.e., Dedicated Traffic Channel (DTCH)) and RRC signaling messages (i.e., Common Control Channel (CCCH) and Dedicated Control Channel (DCCH)). The DL-SCH transport blocks are used for transmitting DL user data (i.e., DTCH), RRC signaling messages (i.e., CCCH and DCCH), and System Information Blocks (SIBs) (i.e., part of Broadcast Control Channel (BCCH)).

Figure 2:
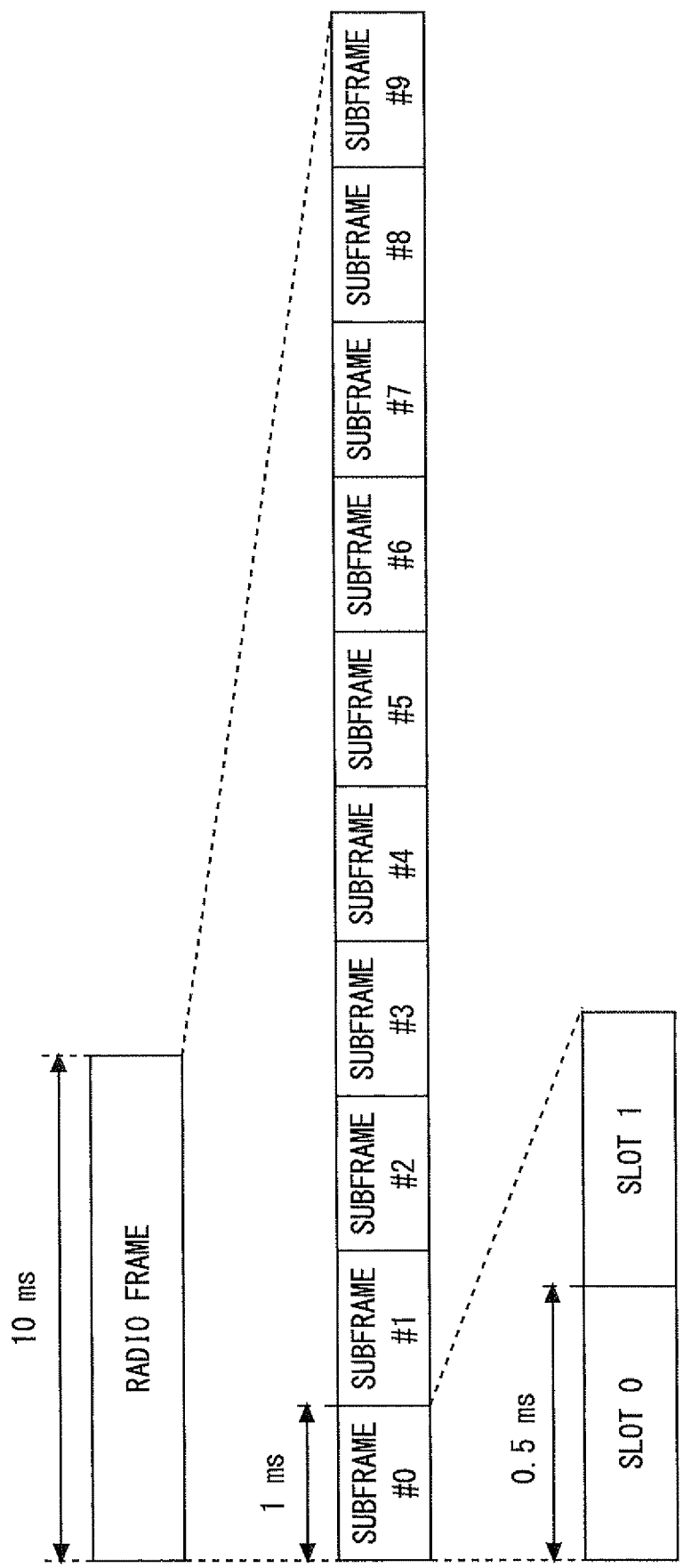
FIG. 2 is a diagram showing a radio frame structure and a subframe structure according to some embodiments.

The subframe according to this embodiment may be the same as that of LTE and LTE-Advanced. The time-frequency resources (radio resources) of LTE will be described with reference to FIGS. 2, 3A, and 3B. FIG. 2 shows a radio frame structure of LTE and LTE-Advanced. In the 3rd Generation Partnership Project (3GPP) Release 8 and subsequent releases, two types of the radio frame structures are specified. One is referred to as a frame structure type 1 and is applied to frequency division duplex (FDD). The other is referred to as a frame structure type 2 and is applied to time division duplex (TDD). As shown in FIG. 2, in both frame structure type 1 and frame structure type 2, the duration of one radio frame is 10 ms, and one radio frame consists of 10 subframes. The duration of one subframe is 1 ms. One subframe is divided into two slots of 0.5 ms each.

Figure 3A:
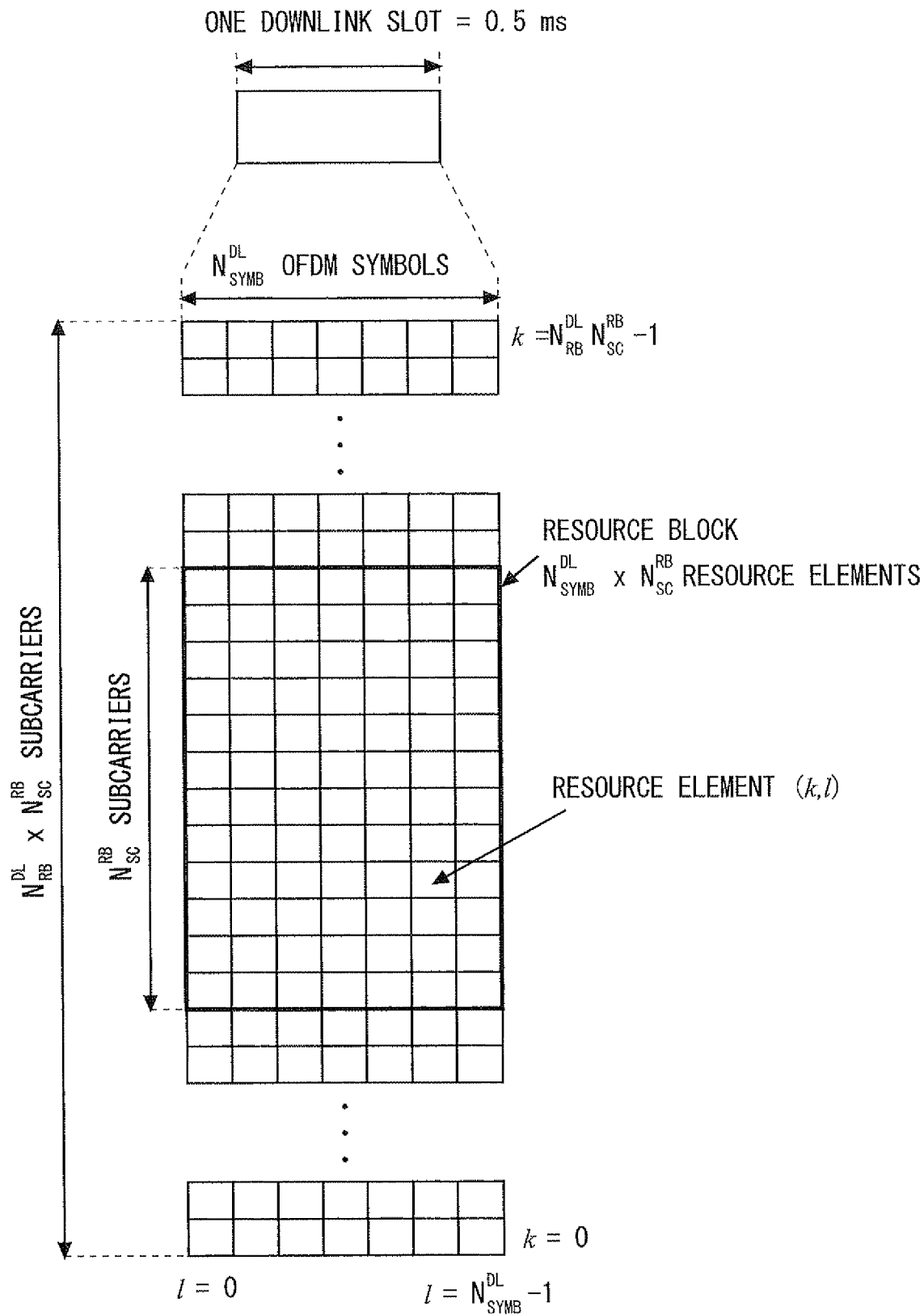
FIG. 3A is a diagram showing a detailed structure of downlink time-frequency resources according to some embodiments.

FIG. 3A shows a detail of downlink time-frequency resources in LTE and LTE-Advanced. One downlink slot (0.5 ms) includes $N^{DL}_{SYMB}$ Orthogonal Frequency Division Multiplexing (OFDM) symbols in the time domain. A radio resource defined by one subcarrier in the time domain and one OFDM symbol in the frequency domain is referred to as a "resource element". The resource element is the minimum unit of radio resources in the downlink of LTE and LTE-Advanced using OFDM. The unit of resources defined by $N^{DL}_{SYMB}$ consecutive OFDM symbols in the time domain and $N^{RB}_{SC}$ consecutive subcarriers in the frequency domain is referred to as a "resource block". In the case of normal cyclic prefix, the value of $N^{DL}_{SYMB}$ is 7 and the value of $N^{RB}_{SC}$ is 12 and, therefore, one downlink resource block consists of 84 resource elements. The occupied bandwidth (i.e., $N^{DL}_{RB}$ resource blocks or $N^{DL}_{RB} N^{RB}_{SC}$ subcarriers) depends on the downlink channel bandwidth ($BW_{Channel}$). For example, if the channel bandwidth is 1.4 MHz, the maximum number of downlink resource blocks ($N^{DL}_{RB}$) is six, and if the channel bandwidth is 20 MHz, the maximum number of downlink resource blocks ($N^{DL}_{RB}$) is 100. Note that, in the downlink, a physical control channel (PDCCH) for transmitting control information is allocated to OFDM symbols (e.g., 1, 2, or 3) at the beginning of the subframe. Therefore, the number of OFDM symbols normally used to transmit user data in the downlink differs between the first and second slots.

Figure 3B:
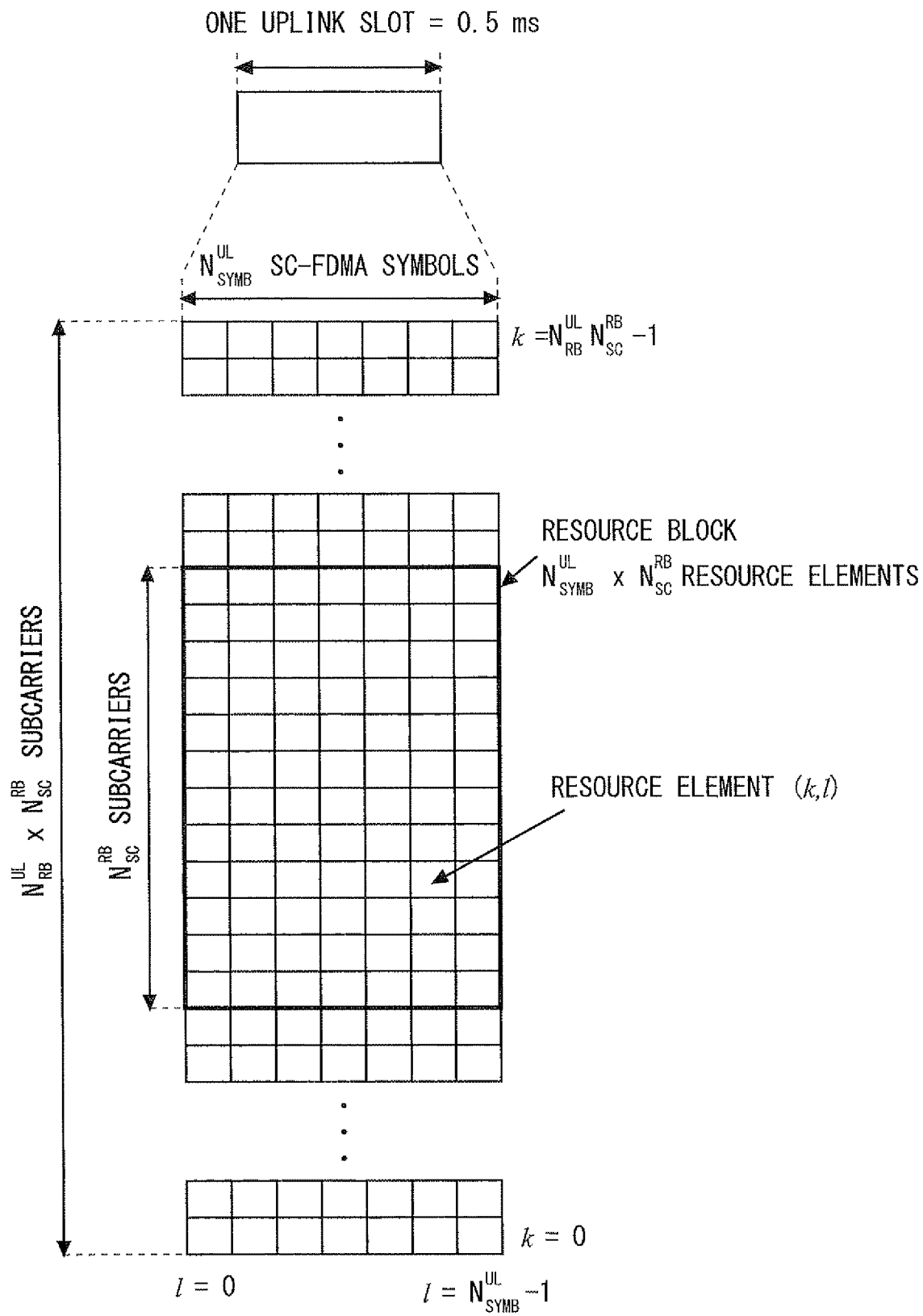
FIG. 3B is a diagram showing a detailed structure of uplink time-frequency resources according to some embodiments.

FIG. 3B shows the details of the uplink time-frequency resource in LTE and LTE-Advanced. One uplink slot (0.5 ms) includes $N^{UL}_{SYMB}$ Single-Carrier Frequency Division Multiple Access (SC-FDMA) symbols in the time domain. Like in the downlink, a radio resource defined by one SC-FDMA symbol in the time domain and one subcarrier in the frequency domain is referred to as a "resource element". The resource element is the minimum unit of radio resources in the uplink of LTE and LTE-Advanced using SC-FDMA. The unit of resources defined by $N^{UL}_{SYMB}$ consecutive SC-FDMA symbols in the time domain and $N^{RB}_{SC}$ consecutive subcarriers in the frequency domain is referred to as a "resource block". Like in the downlink, in the case of normal cyclic prefix, the value of $N^{UL}_{SYMB}$ is 7 and the value of $N^{RB}_{SC}$ is 12 and, thus, one uplink resource block consists of 84 resource elements. The occupied bandwidth (i.e., $N^{UL}_{RB}$ resource blocks or $N^{UL}_{RB} N^{RB}_{SC}$ subcarriers) depends on the uplink channel bandwidth ($BW_{Channel}$). For example, if the channel bandwidth is 1.4 MHz, the maximum number of uplink resource blocks ($N^{UL}_{RB}$) is 6, and if the channel bandwidth is 20 MHz, the maximum number of uplink resource blocks ($N^{UL}_{RB}$) is 100.

In order to enable the first access and the second access, the BS 3 according to this embodiment is configured to allocate a first plurality of time-frequency resources and a second plurality of time-frequency resources to at least one radio terminal (i.e., to the non-legacy UE 2 or to both the legacy UE 1 and the non-legacy UE 2). Each time-frequency resource included in the first plurality of time-frequency resources and the second plurality of time-frequency resources is the minimum resource unit. Each time-frequency resource may be, for example, a radio resource defined by one symbol in the time domain and one subcarrier in the frequency domain (e.g., a resource element in LTE/ LTE-Advanced).

In some implementations, the BS 3 may allocate the first plurality of time-frequency resources and the second plurality of time-frequency resources to different UEs. For example, the BS 3 may allocate the first plurality of time-frequency resources to the legacy UE 1 and the second plurality of time-frequency resources to the non-legacy UE 2. Additionally or alternatively, the BS 3 may allocate the first plurality of time-frequency resources and the second plurality of time-frequency resources to the same UE (the non-legacy UE 2).

The first plurality of time-frequency resources are used to transmit or receive a first transport block in accordance with the first TTI (e.g., 1 ms). On the other hand, the second plurality of time-frequency resources are used to transmit or receive a second transport block in accordance with the second TTI (e.g., 0.5 ms).

Note that the entire first transport block is used to calculate first error detection bits (e.g., CRC parity bits) and the first error detection bits are added to the first transport block. Similarly, the entire second transport block is used to calculate second error detection bits (e.g., CRC parity bits) and the second error detection bits are added to the second transport block. Therefore, strictly speaking, the first plurality of time-frequency resources are used to transmit or receive the first transport block and the first error detection bits added thereto in accordance with the first TTI (e.g., 1 ms). The second plurality of time-frequency resources are used to transmit or receive the second transport block and the second error detection bits added thereto in accordance with the second TTI (e.g., 1 ms).

As already mentioned, the first TTI is equal to the duration of one subframe (i.e., subframe duration). Accordingly, the duration of the first plurality of time-frequency resources corresponds to the duration of one subframe. The duration of the first plurality of time-frequency resources means the entire length of time (time length) over which these time-frequency resources continue or last. The duration of the first plurality of time-frequency resources does not need to exactly match the duration of one subframe (e.g., 1 ms). This is because particular time-frequency resources in a subframe are reserved for Synchronization Signals (SS), Reference Signals (RS), control information channels (e.g., Physical Downlink Control Channel (PDCCH), Enhanced PDCCH (EPDCCH), or Physical Uplink Control Channel (PUCCH) in LTE and LTE-Advanced) or a broadcast information channel (e.g., Physical Broadcast Channel (PBCH) in LTE and LTE-Advanced). Specifically, in the case of the downlink subframe in LTE and LTE-Advanced, the resource elements of the first to third symbols at the beginning of the subframe are used for PDCCH, and some resource elements distributed in fourth to fourteenth symbols are used for SS, RS, and PBCH. Thus, the expression that the duration of the first plurality of time-frequency resources "corresponds" to the duration of one subframe means that the duration of the first plurality of time-frequency resources is equal to the duration of one subframe excluding a symbol time used for other purposes such as PDCCH transmission or the like. In other words, the duration of the first plurality of time-frequency resources is equal to the duration of one subframe minus the symbol time used for other purposes such as PDCCH transmission.

In addition, the first plurality of time-frequency resources may not be consecutive resources in the time-frequency space. In other words, the first plurality of time-frequency resources allows its frequency resources (e.g., subcarriers or resource blocks (RBs)) to be changed during the duration of the first plurality of time-frequency resources for frequency hopping or disturbed mapping. To be more specific, in the case of the 1 ms subframe in LTE and LTE-Advanced, the duration of the first plurality of time-frequency resources includes two temporally consecutive resource blocks (i.e., a pair of resource blocks). One of the two resource blocks (RBs) is arranged in the first slot (0.5 ms), and the other is arranged in the second slot (0.5 ms). Thus, the duration of these two RBs corresponds to a subframe of 1 ms. However, these two RBs may be spaced apart from each other in frequency.

On the other hand, as described above, the second TTI is shorter than the duration of one subframe. Accordingly, the duration of the second plurality of time-frequency resources is shorter than the duration of one subframe. That is, the duration of the second plurality of time-frequency resources is shorter than the duration of the first plurality of time-frequency resources corresponding to the duration of one subframe. The second plurality of time-frequency resources allows its frequency resources (e.g., subcarriers or resource blocks (RBs)) to be changed during the duration of the second plurality of time-frequency resources for frequency hopping or disturbed mapping.

In some implementations, like the subframe in LTE and LTE-Advanced, the subframe according to this embodiment may be composed of a plurality of time slots. Each of the time slots includes a plurality of time-frequency resources. In this case, the second TTI may be equal to the duration of at least one of the time slots. Further, the duration of the second plurality of time-frequency resources may correspond to the second TTI. In other words, the duration of the second plurality of time-frequency resources may correspond to the duration of at least one time slot. The expression that the duration of the second plurality of time-frequency resources "corresponds" to the duration of at least one time slot means that the duration of the second plurality of time-frequency resources is equal to the duration of at least one time slot excluding a symbol time used for other purposes such as PDCCH transmission or the like.

For example, in the case of LTE and LTE-Advanced, a 1 ms subframe includes two slots of 0.5 ms each. In this case, the second TTI may be equal to the duration of one slot (0.5 ms) and, accordingly, the duration of the second plurality of time-frequency resources may correspond to the duration of one slot (0.5 ms).

The non-legacy UE 2 is configured to perform at least a second access operation. The non-legacy UE 2 may be configured to selectively perform a first access operation and the second access operation. The first access operation includes transmitting or receiving the first transport block in accordance with the first TTI. The second access operation includes transmitting or receiving the second transport block in accordance with the second TTI. As has been described in regard to the BS 3, the first transport block is transmitted using the first plurality of time-frequency resources in one subframe. On the other hand, the second transport block is transmitted using the second plurality of time-frequency resources in one subframe.

As already mentioned, the first and second accesses may be performed in one subframe. In other words, the first and second transport block may be transmitted in the same radio frame. Further in other words, the second plurality of time-frequency resources may be allocated within the same subframe as the first plurality of time-frequency resources. Within one subframe, at least some of the second plurality of time-frequency resources may overlap with at least some of the first plurality of time-frequency resources. In this case, the transport block for the first access and the transport block for the second access may be multiplexed onto the same time-frequency resources using Code Division Multiplexing (CDM).

Moreover, multiple second accesses may be performed by one or more non-legacy UEs 2 in one subframe. In this case, the multiple second accesses may be performed using different time-frequency resources. Alternatively, the transport blocks of the multiple second accesses may be multiplexed onto the same time-frequency resources using Code Division Multiplexing (CDM).

The configuration for the second access may be made semi-statically or dynamically. In the case of a semi-static configuration, the BS 3 may notify the non-legacy UE 2 of the configuration using broadcast information (e.g., SIB) or dedicated signaling (e.g., RRC signaling). In the case of a dynamic configuration, the BS 3 may notify the non-legacy UE 2 of the configuration using control information of the MAC layer or the physical layer.

As understood from the above description, the non-legacy UE 2 and the BS 3 according to this embodiment are configured to perform the second access in accordance with the second TTI, which is shorter than the first TTI, in the subframe having the duration equivalent to the first TTI which the first access is performed in accordance with. Therefore, the radio communication system according to this embodiment can perform the first access for the legacy UE 1 and the second access for the non-legacy UE 2 by using the same subframe. The second access allows the receiver to performing reception processing in a short time by using the short second TTI and can therefore contribute to reducing some kind of access latency.

Figure 4:
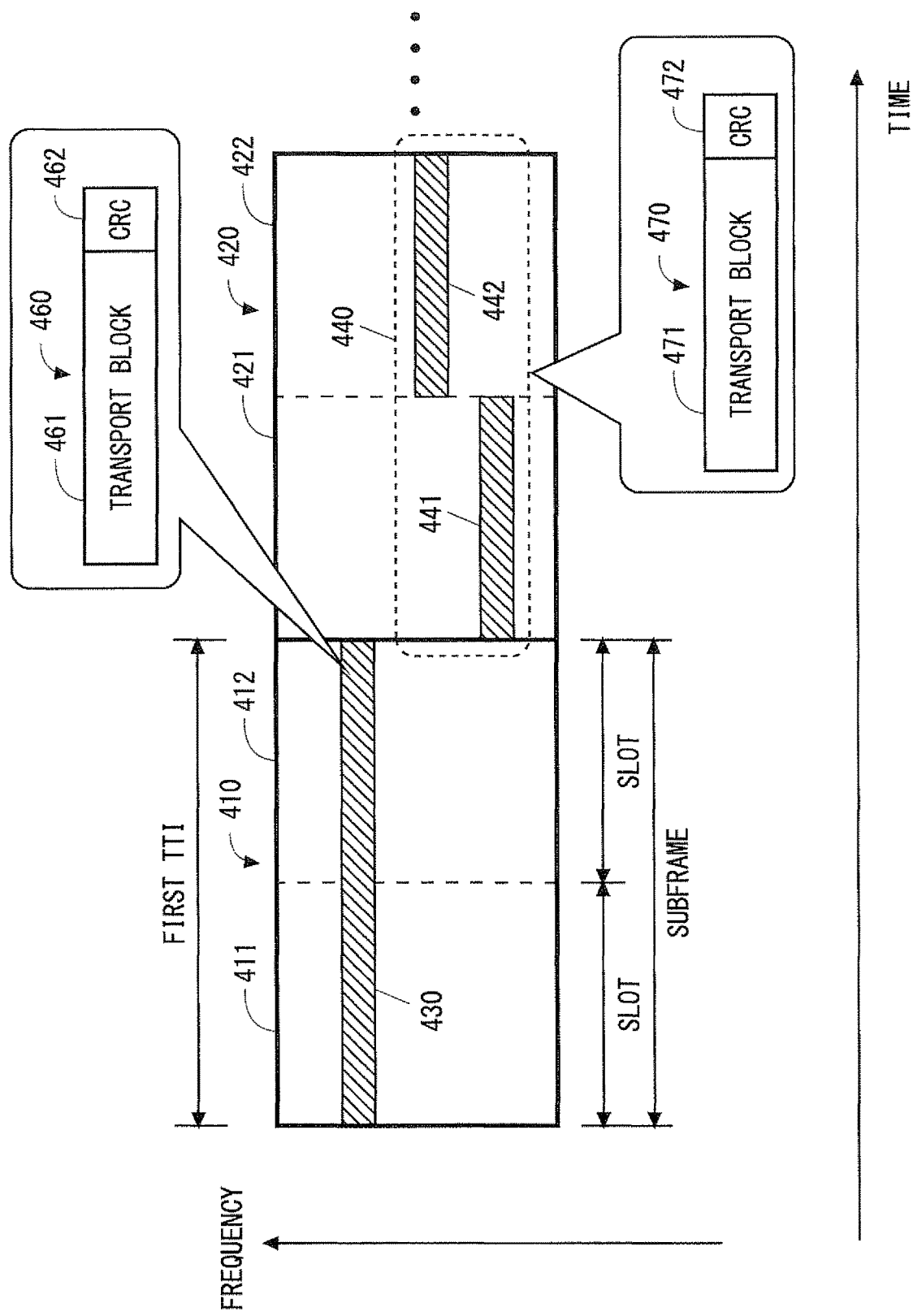
FIG. 4 is a diagram showing an example of allocation of time-frequency resources to a legacy UE according to a first embodiment.

Hereinafter, specific examples of the allocation of time-frequency resources for the first and second accesses will be described with reference to FIGS. 4 and 5. FIG. 4 shows an example of allocating the first plurality of time-frequency resources to the first access. FIG. 4 shows two consecutive subframes 410 and 420 in the time domain. The subframes 410 and 420 are UL subframes or DL subframes. The duration of each subframe 410 and 420 is equal to the first TTI (e.g., 1 ms). The subframe 410 is composed of slots 411 and 412 each having duration equal to half the duration of the subframe 410. Similarly, the subframe 420 is composed of slots 421 and 422.

In the example of FIG. 4, a time-frequency resource 430 in the subframe 410 is allocated to the first access. The time-frequency resource 430 includes a plurality of time-frequency resources (e.g., resource elements or resource blocks). The duration of the time-frequency resource 430 corresponds to the duration of the subframe 412 (i.e., the first TTI). The time-frequency resource 430 is used by the legacy UE 1 (or the non-legacy UE 2) to transmit or receive a CRC-parity-bits-added transport block 460. The CRC-parity-bits-added transport block 460 includes a transport block 461 and CRC parity bits 462.

As already described, the physical layer process at the transmitter, including calculation of error detection bits, channel coding, and interleaving, is performed on one transport block (MAC PDU) 461. Therefore, in order to perform deinterleaving, decoding and error detection and then obtain the transport block 461, the receiver at the legacy UE 1 (or the non-legacy UE 2) or the BS 3 needs to receive the entire time-frequency resource 430 corresponding to the transport block 461. That is, in the example of FIG. 4, the receiver at the legacy UE 1 (or the non-legacy UE 2) or the BS 3 can obtain the transport block 461 after receiving until the end of the subframe 410 corresponding to the first TTI.

The subframe 420 represented in FIG. 4 shows an example in which frequency hopping or distributed mapping is performed. That is, a time-frequency resource 440 is composed of a time-frequency resource 441 of 0.5 ms and a time-frequency resource 442 of 0.5 ms. The time-frequency resources 441 and 442 are spaced apart from each other in frequency. It should be noted that in order to perform deinterleaving, decoding, and error detection based on the CRC parity bits 472 and then obtain the transport port block 471, the receiver at the legacy UE 1 (or the non-legacy UE 2) or the BS 3 needs to receive the entire time-frequency resource 440 corresponding to the transport block 471. This is because the first TTI is equal to the duration of the subframe 420 and hence the CRC-parity-bits-added transport block 470 is transmitted using the entire time-frequency resource 440 after it has been subjected to the channel coding and interleaving.

Note that some time-frequency resources in the subframes shown in FIG. 4 may be used for other purposes such as transmission of control channels and synchronization signals. For example, in the case of LTE/LTE-Advanced, the first to third symbols at the beginning of the subframe are used as the PDCCH region. Therefore, if the subframes 410 and 420 shown in FIG. 4 are DL subframes of LTE/LTE-Advanced, each of the time-frequency resources 430 and 440 allocated for the first access are time-frequency resources excluding the first to third symbols at the beginning of the subframe. As has been described above, the expression that the duration of the first plurality of time-frequency resources 430 (440) "corresponds" to the duration of the subframe 410 (420) (i.e., the first TTI) means that the duration of the first plurality of time-frequency resources 430 (440) is equal to the duration of one subframe excluding a symbol time used for other purposes such as PDCCH transmission or the like.

Figure 5:
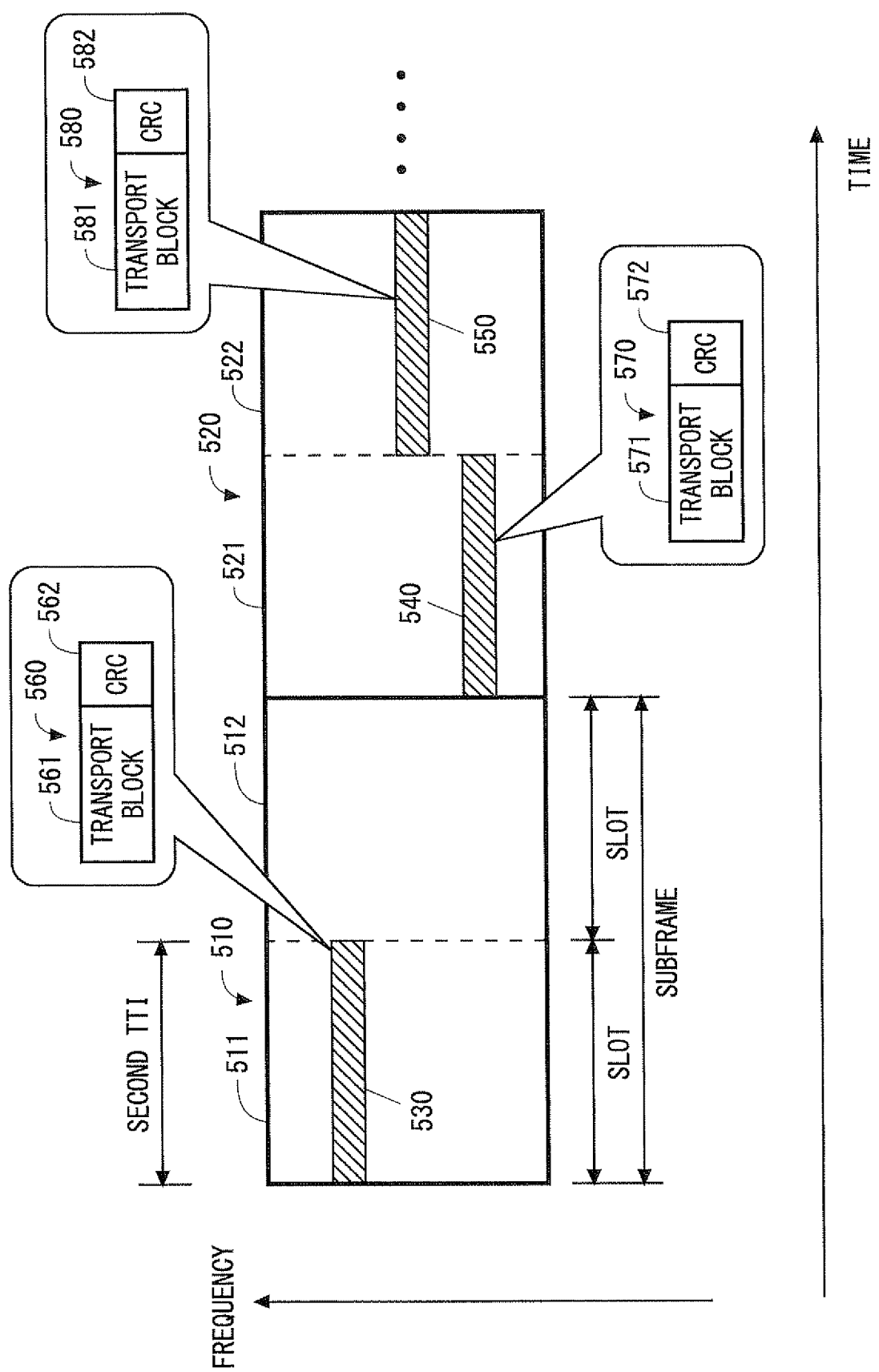
FIG. 5 is a diagram showing an example of allocation of time-frequency resources to a non-legacy UE according to the first embodiment.

FIG. 5 shows an example of allocating the second plurality of time-frequency resources to the second access by the non-legacy UE 2. FIG. 5 shows two consecutive subframes 510 and 520 in the time domain. The subframes 510 and 520 are UL subframes or DL subframes. The subframe 510 is composed of slots 511 and 512 each having duration equal to half the duration of subframe 510. Similarly, the subframe 520 is composed of slots 521 and 522. In the example of FIG. 5, the second TTI is half the subframe duration (e.g., 1 ms) and is equal to the duration of each of the slots 511, 512, 521, and 522 (e.g., 0.5 ms).

In the example of FIG. 5, a time-frequency resource 530 in the subframe 510 is allocated to the second access by the non-legacy UE 2. The time-frequency resource 530 includes a plurality of time-frequency resources (e.g., resource elements or resource blocks). The duration of the time-frequency resource 530 corresponds to the duration of the slot 511 (i.e., the second TTI). The time-frequency resource 530 is used by the non-legacy UE 2 to transmit or receive a CRC-parity-bits-added transport block 560. The CRC-parity-bits-added transport block 560 includes a transport block 561 and CRC parity bits 562.

In order to perform deinterleaving, decoding, and error detection and then obtain the transport port block 561, the receiver at the non-legacy UE 2 or the BS 3 needs to receive only the time-frequency resource 530 corresponding to the transport block 561. In comparing FIG. 4 to FIG. 5, the second TTI of FIG. 5 is half the length of the first TTI of FIG. 4. Thus, the non-legacy UE 2 can perform reception processing including deinterleaving, decoding, and error detection and then obtain the transport block 561 after receiving only the time-frequency resource 530 having a one-slot length.

The subframe 520 represented in FIG. 5 shows an example in which transmission for the second access is performed in each of the first slot 521 and the second slot 522 in the subframe 520. The time-frequency resource 540 in the first slot 521 is used by the non-legacy UE 2 to transmit or receive a CRC-parity-bits-added transport block 570. On the other hand, the time-frequency resource 550 in the second slot 522 is used by the non-legacy UE 2 to transmit or receive a CRC-parity-bits-added transport block 580. The time-frequency resources 540 and 550 may be allocated to the same non-legacy UE 2 or may be allocated to different non-legacy UEs 2.

After receiving only the time-frequency resource 540, the non-legacy UE 2 can perform reception processing including deinterleaving, decoding, and error detection based on CRC parity bits 572 and then obtain a transport block 571. Likewise, after receiving only the time-frequency resource 550, the non-legacy UE 2 can perform reception processing including deinterleaving, decoding, and error detection based on CRC parity bits 582 and then obtain a transport block 581.

Note that some time-frequency resources in the subframes shown in FIG. 5 may be used for other purposes such as transmission of control channels and synchronization signals. If the subframes 510 and 520 shown in FIG. 5 are DL subframes of LTE/LTE-Advanced, each of the time-frequency resources 530, 540, and 550 allocated for the first access are time-frequency resources excluding the first to third symbols at the beginning of the subframe. As has been described above, the expression that the duration of the second plurality of time-frequency resources 530 (540, 550) "corresponds" to the duration of the slot 511 (521, 522) (i.e., the second TTI) means that the duration of the second plurality of time-frequency resources 530 (540, 550) is equal to the duration of one subframe excluding a symbol time used for other purposes such as PDCCH transmission or the like.

In the example shown in FIG. 5, frequency hopping or distributed mapping may be performed in each slot. For example, the time-frequency resource 530 may include two or more resource segments spaced apart from each other in frequency.

In the example in FIG. 5, each subframe may be composed of three or more time slots. In this case, the duration of each of the time-frequency resources 530, 540, and 550 may correspond to the duration of one or more time slots.

Hereinafter, an improvement to a Scheduling Request (SR) for UL transmission will be described. In some implementations, the non-legacy UE 2 may transmit a Scheduling Request (SR) to request BS 3 to allocate UL transmission resources. The non-legacy UE 2 may transmit an SR for the second access using a plurality of time-frequency resources having a shorter duration than those used for transmission of an SR for the first access.

In some implementations, in the case of the first access, the non-legacy UE 2 may transmit Uplink Control Information (UCI) containing an SR using a third plurality of time-frequency resources in a subframe. The duration of the third plurality of time-frequency resources corresponds to the duration of one subframe. On the other hand, in the case of the second access, the non-legacy UE 2 may transmit Uplink Control Information (UCI) containing an SR using a fourth plurality of time-frequency resources in a subframe. The duration of the fourth plurality of time-frequency resources is shorter than the duration of one subframe. For example, the duration of the fourth plurality of time-frequency resources may be the same as or shorter than the duration of the second TTI.

By transmitting an SR for the second access in a shorter time than that taken to transmit an SR for the first access, the BS 3 is more likely to initiate transmitting of the UL scheduling grant in response to the SR for the second access at an earlier timing. This contributes to reducing some kind of access latency.

Figure 6:
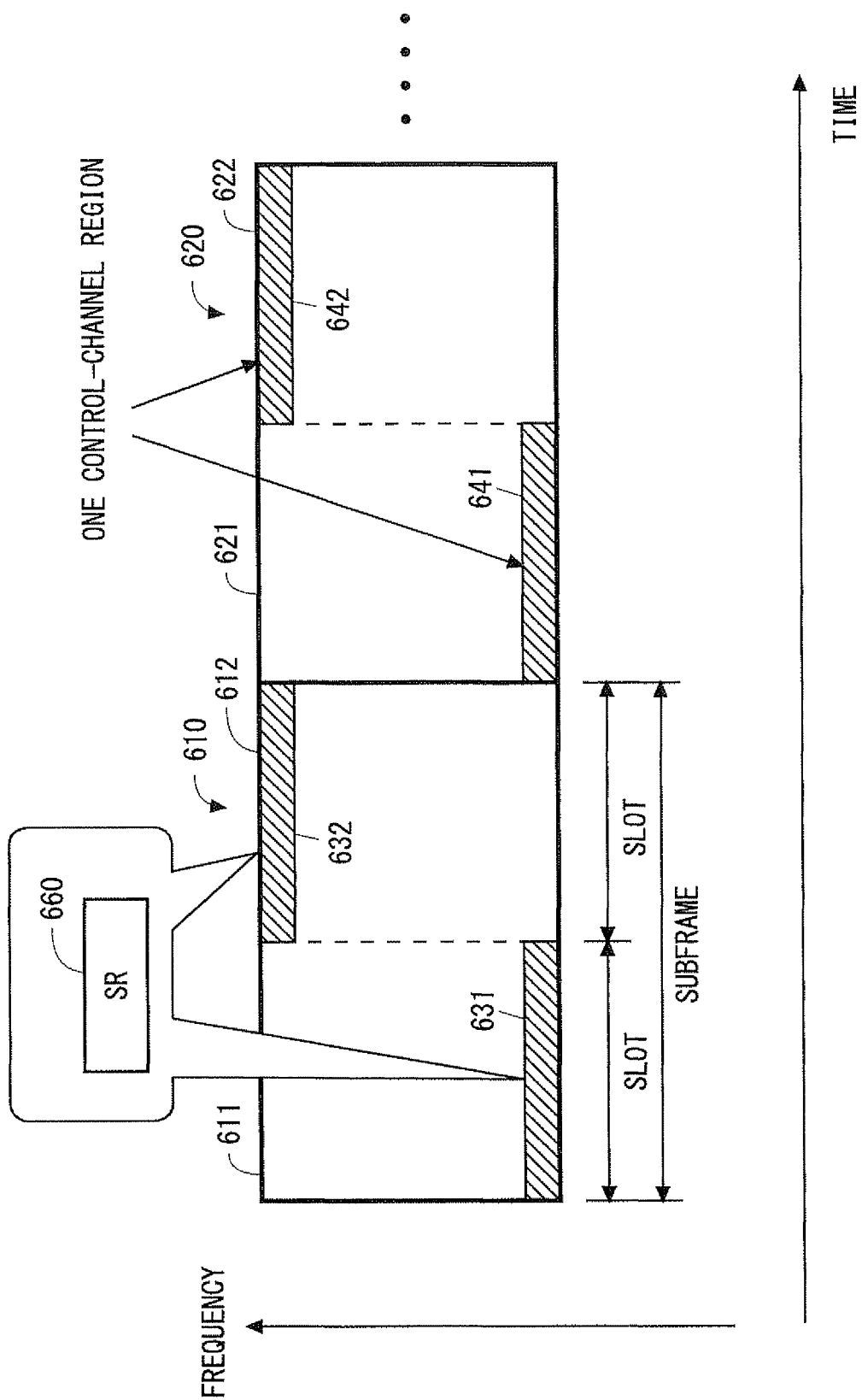
FIG. 6 is a diagram showing an example of allocation of time-frequency resources to a legacy UE according to the first embodiment.

Specific examples of allocation of uplink time-frequency resources to transmit an SR will be described with reference to FIGS. 6 and 7. FIG. 6 shows an example of allocation of the third plurality of time-frequency resources to transmit an SR for the first access. FIG. 6 shows two consecutive UL subframes 610 and 620 in the time domain. The UL subframe 610 is composed of slots 611 and 612 each having duration equal to half the duration of the subframe 610. Similarly, the subframe 620 is composed of slots 621 and 622.

In the example shown in FIG. 6, like the arrangement of the PUCCH regions in LTE and LTE-Advanced, resources positioned near both ends of the UL system bandwidth are used for control channels. More specifically, an SR 660 is transmitted using time-frequency resources 631 and 632 in the subframe 610. The duration of the pair of time-frequency resources 631 and 632 allocated to one UE (UE 1 or UE 2) is equal to the duration of one subframe. The pair of time-frequency resources 631 and 632 is referred to as a control channel region (e.g., PUCCH region). A pair of time-frequency resources 641 and 642 in the subframe 620 is also a control channel region and can be used to transmit an SR.

Figure 7:
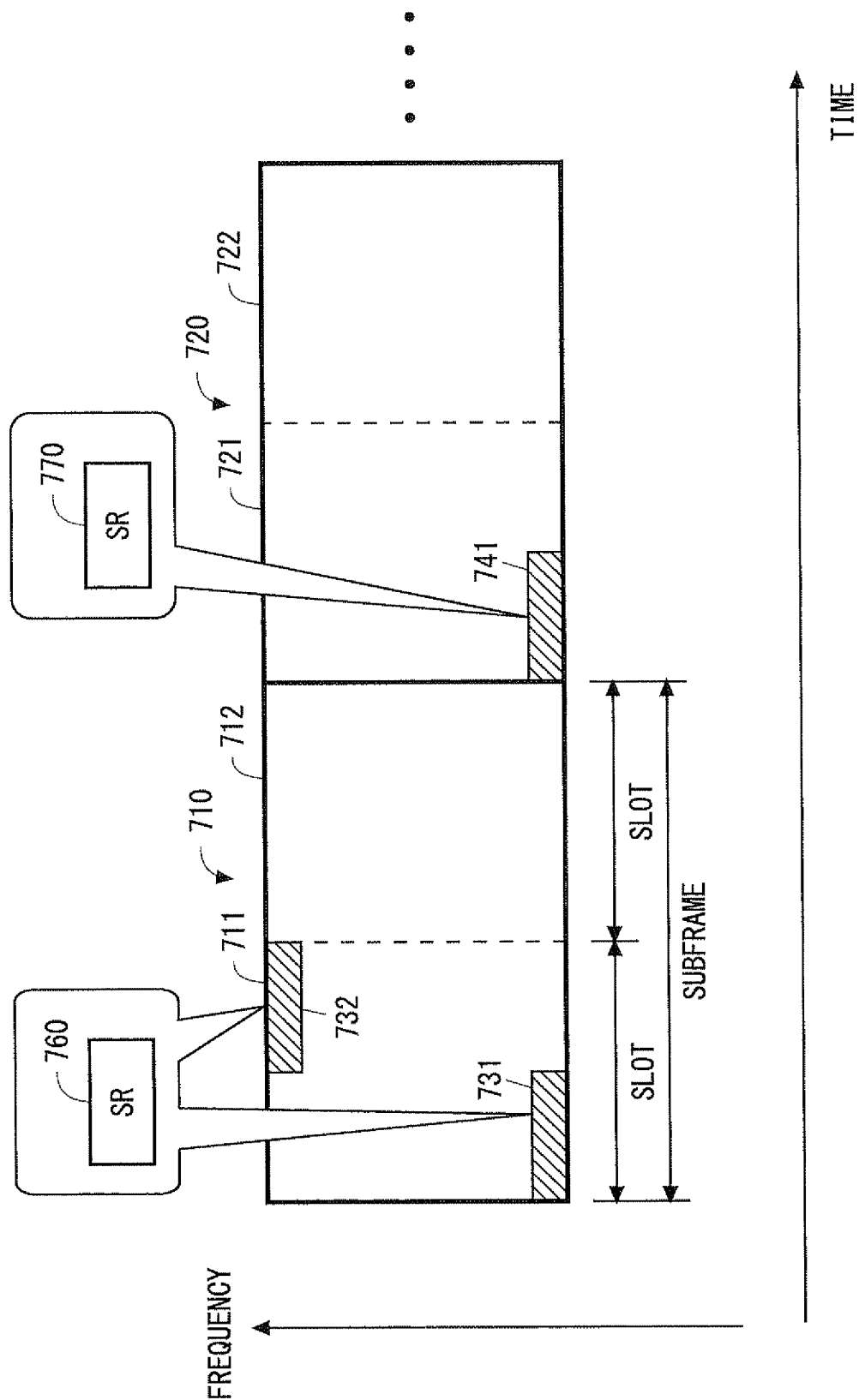
FIG. 7 is a diagram showing an example of allocation of time-frequency resources to a non-legacy UE according to the first embodiment.

FIG. 7 shows an example of allocation of the fourth plurality of time-frequency resources to transmit an SR for the second access. FIG. 7 shows two consecutive UL subframes 710 and 720 in the time domain. The UL subframe 710 is composed of slots 711 and 712 each having duration equal to half the duration of the subframe 710. Similarly, the subframe 720 is composed of slots 721 and 722.

Also in the example of FIG. 7, resources positioned near both ends of the UL system bandwidth are used for control channels like the arrangement in the PUCCH regions in LTE and LTE-Advanced. More specifically, an SR 760 is transmitted using time-frequency resources 731 and 732 in one slot 711. The duration of the pair of time-frequency resources 731 and 732 allocated to one non-legacy UE 2 is equal to the duration of one slot. Thus, in the example of FIG. 7, the transmission of an SR can be completed in a shorter time than in the example of FIG. 6. The duration of the time-frequency resource 731 may be the same as or differ from that of the time-frequency resource 732. For example, like the slots of LTE and LTE-Advanced, if the number of resource elements in one slot is an odd number (e.g., seven symbols), the segments (731 and 732) obtained by dividing these resource elements by an even number may have different durations from each other.

Further, as shown in the subframe 720 represented in FIG. 7, an SR may be transmitted in a time shorter than half the duration of one subframe. In this example, an SR 770 is transmitted using a time-frequency resource 741.

The time-frequency resources 731, 732, and 741 allocated to the non-legacy UE 2 for the second access may be multiplexed using time division multiplexing (TDM) to the time-frequency resources 631, 632, 641, and 642 allocated to the legacy UE 1 for the first access on a subframe-to-subframe basis. That is, in one subframe, particular time-frequency resources may be allocated to the non-legacy UE 2 for the second access, while in another subframe, these particular time-frequency resources may be allocated to the legacy UE 1 for the first access. Alternatively, the time-frequency resources 731, 732, and 741 allocated to the non-legacy UE 2 for the second access may be multiplexed using frequency division multiplexing (FDM) to the time-frequency resources 631, 632, 641, and 642 allocated to the legacy UE 1 for the first access in one subframe.

Figure 8A:
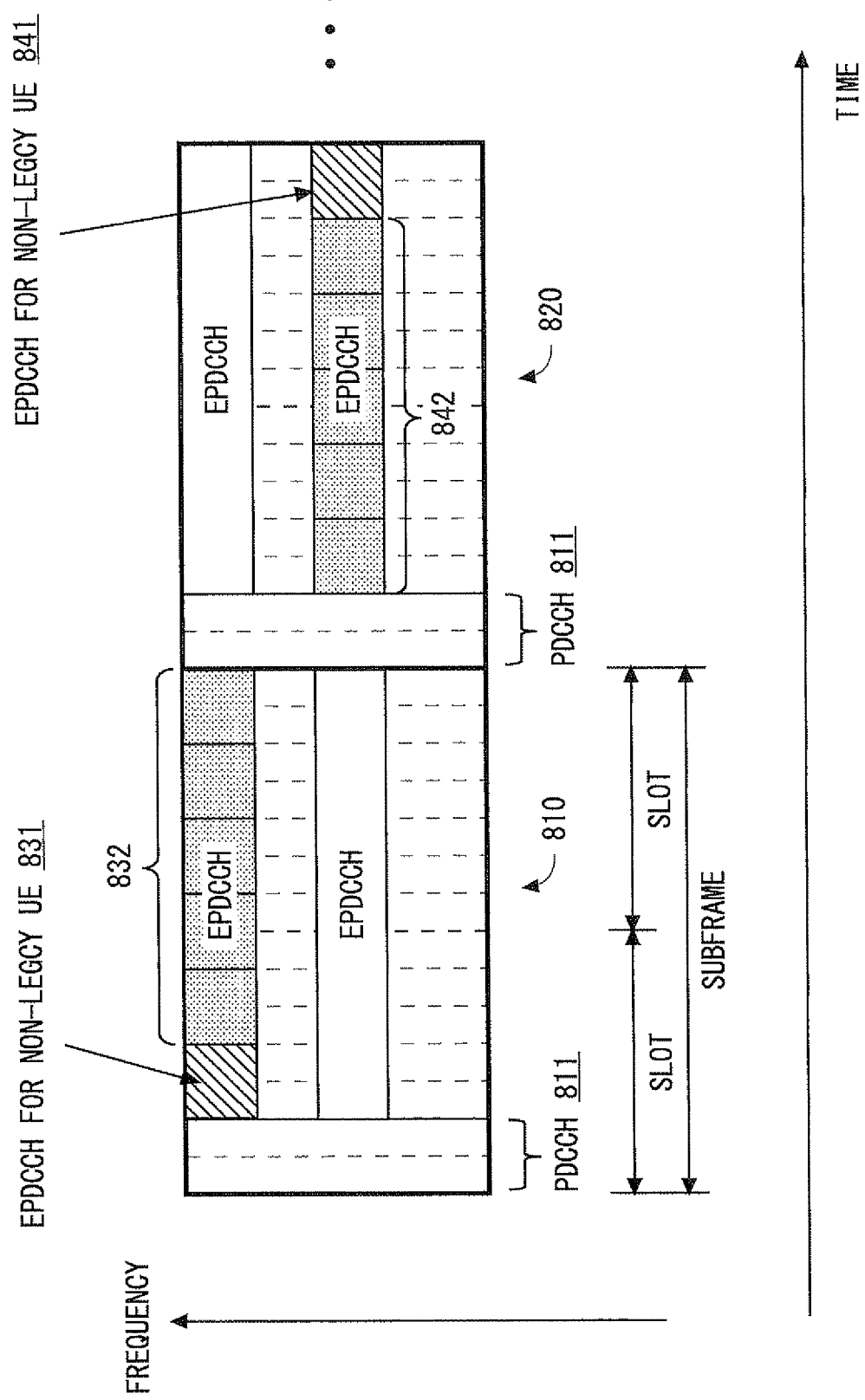
FIG. 8A is a diagram showing an example of allocation of time-frequency resources to a non-legacy UE according to the first embodiment.
Figure 8B:
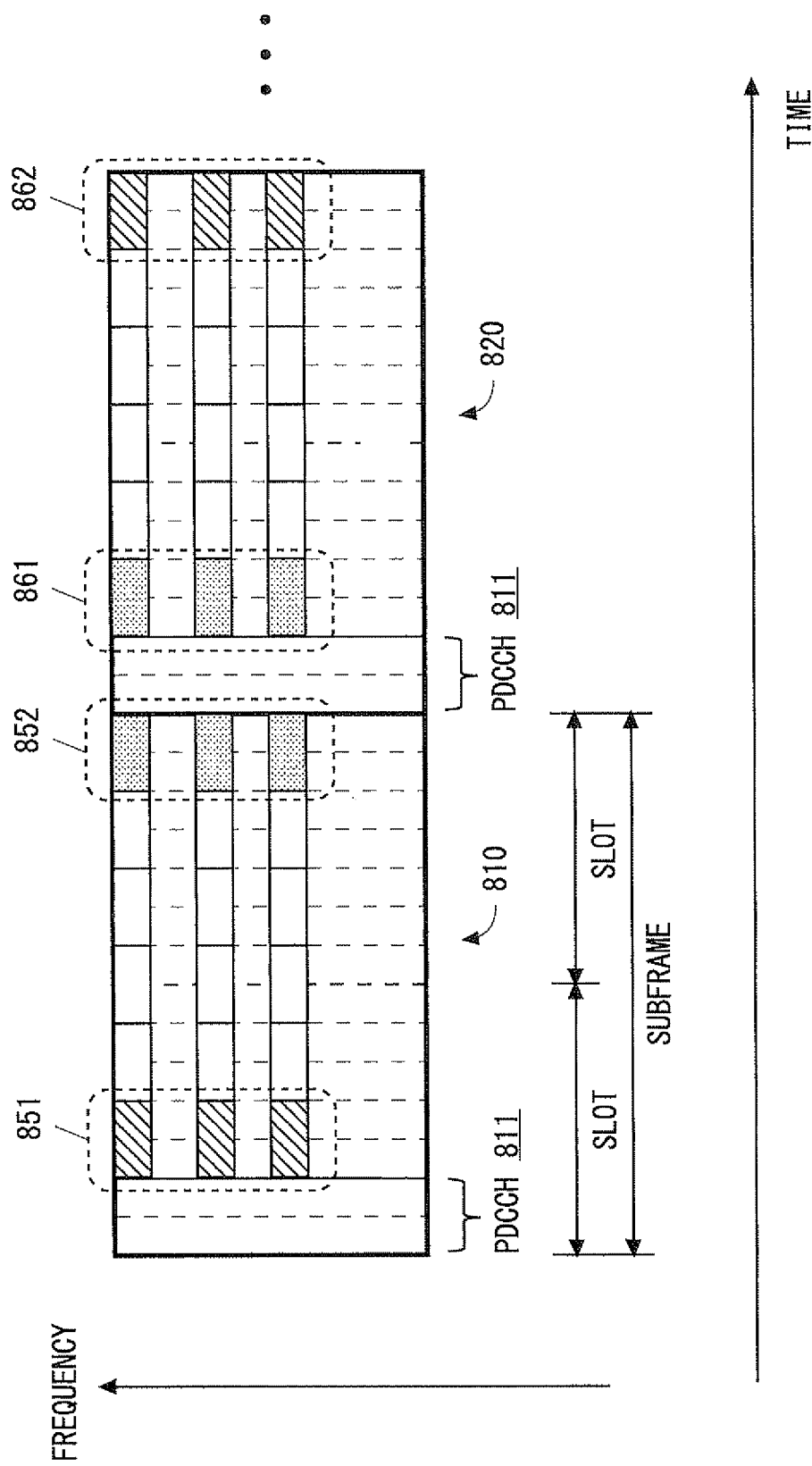
FIG. 8B is a diagram showing an example of allocation of time-frequency resources to a non-legacy UE according to the first embodiment.

Hereinafter, specific examples of allocation of downlink time-frequency resources to transmit a UL scheduling grant (UL grant) will be described with reference to FIGS. 8A and 8B. FIGS. 8A and 8B show examples of allocation of a plurality of downlink time-frequency resources to transmit a UL grant for the second access. LTE-Advanced specifies two EPDCCH transmission schemes, i.e., localized transmission (mapping) and distributed transmission (mapping). FIG. 8A relates to localized mapping and shows two temporally consecutive subframes 810 and 820. In the example of FIG. 8A, in order to enable Downlink Control Information (DCI) containing a UL grant and the like to be transmitted in a shorter time than in the existing LTE-Advanced, TDM is performed on localized-mapped EPDCCH in one subframe. That is, a time-frequency resource 831 (841) having two-symbol duration in an EPDCCH region is allocated to the non-legacy UE 2 and used for transmission of a UL grant. The remaining resources 832 (842) in the same EPDCCH region as the resource 831 (841) may be allocated to the same non-legacy UE 2 as the resource 831 (841) or may be allocated to another non-legacy UE 2.

On the other hand, FIG. 8B relates to distributed transmission (mapping). In the example of FIG. 8B, in order to enable downlink control information (DCI) containing a UL grant and the like to be transmitted in a shorter time than in the existing LTE-Advanced, TDM is performed on distributed-mapped EPDCCH in one subframe. That is, a time-frequency resource 851 (861) having two-symbol duration in an EPDCCH region is allocated to the non-legacy UE 2 and used for transmitting a UL grant. The remaining resources 852 (862) in the same EPDCCH region as the resource 851 (861) may be allocated to the same non-legacy UE 2 as the resource 851 (861) or may be allocated to another non-legacy UE 2.

Hereinafter, a specific example of a procedure for starting the second access will be described. The non-legacy UE 2 is configured to transmit UE assistance information (e.g., UE assistance information for low latency access) to the BS 3. The BS 3 is configured to receive the UE assistance information from the non-legacy UE 2 capable of performing the second access.

The UE assistance information may include information, regarding when the non-legacy UE 2 transmits a UL signal in accordance with the second TTI, including at least one of: an expected latency time; an allowable latency time; an expected data amount; an expected frequency of occurrence of communication according to the second TTI; and an access category used by the non-legacy UE 2 when transmitting a UL signal.

Additionally or alternatively, the UE assistance information may include at least one of: capability information indicating presence or absence of capability of performing the second access; an access purpose indicating whether the second access is required; information indicating an intended application or service; and a moving speed of the non-legacy UE 2.

In some implementations, the BS 3 may take into account the received UE assistance information when allocating, to the non-legacy UE 2, UL time-frequency resources (e.g., PUCCH resources) used for transmitting a scheduling request (SR) for the second access. As a result of this, the BS 3 can appropriately allocate UL time-frequency resources for transmitting a SR for the second access.

In some implementations, the BS 3 may take into account the received UE assistance information when determining in advance the amount of time-frequency resources allocated by one UL grant for the second access. As a result of this, the BS 3 can appropriately allocate the UL time-frequency resources by the UL grant.

In some implementations, the BS 3 may take into account the UE assistance information received from the non-legacy UE 2 when determining whether to perform the second access with the non-legacy UE 2. As a result of this, for example, the BS 3 can control the non-legacy UE 2 to perform the second access only in situations where the second access is suitable. Accordingly, it is possible to efficiently accommodate the non-legacy UE 2 performing the second access and the legacy UE 1 not performing the second access in the radio communication system.

In some implementations, in response to receiving the UE assistance information, the BS 3 may transmit configuration information (e.g., configuration for low latency access) regarding the second access to the non-legacy UE 2. The configuration information may include assignment information of uplink radio resources (e.g., PUCCH resources) used for transmitting a scheduling request (SR) for the second access.

In some implementations, the UE assistance information may be transmitted from the non-legacy UE 2 to the BS 3 in advance before the second access is performed. For example, the non-legacy UE 2 may transmit the UE assistance information to the BS 3 in response to establishment of a radio connection (RRC connection) with the BS 3. As a result of this, the BS 3 can previously determine the configuration regarding the second access (e.g., grant for the second access, resource allocation for an SR, amount of time-frequency resources allocated by one UL grant).

In some implementations, the non-legacy UE 2 may transmit the UE assistance information in response to a request from the BS 3. Alternatively, when the content (or configuration) of the UE assistance information is updated (or changed), the non-legacy UE 2 may transmit the updated (or changed) UE assistance information to the BS 3.

In some implementations, when the non-legacy UE 2 is handed over to a cell of another BS (target BS), the BS 3 (source BS) may send the UE assistance information of this non-legacy UE 2 to the target BS. The UE assistance information may be sent from the BS 3 (source BS) to the target BS via a higher network node (e.g., Mobility Management Entity (MME)).

In the following, Specific examples of the above-described UE assistance information and the configuration information regarding the second access are described. The UE assistance information transmitted from the non-legacy UE 2 to the BS 3 may be, for example, any one or any combination of the following information items (1) to (6).

(1) Information Regarding the Expected Latency

The information regarding the latency may indicate a latency requirement (e.g., [1 ms, 2 ms, 5 ms . . . ]). The information regarding the latency may indicate an allowed latency time (allowed latency) (e.g., [5 ms, 10 ms, 20 ms . . . ], [normal, short, very short . . . ]). For example, the shorter the latency time requested or allowed by the non-legacy UE, the shorter the duration of dedicated SR radio resources to be allocated to the non-legacy UE by the BS 3. The BS 3 may more schedule the data transmission of the non-legacy UE in such a way that the shorter the latency time required or allowed by the non-legacy UE, the higher priority the BS 3 puts on scheduling the data transmission of the non-legacy UE.

(2) Information Regarding Access Category

The information regarding the access category may indicate an access type (e.g., [type 1 {always low latency}, type 2 {normal (legacy), and low latency}]) to indicate which access type the UE 2 uses when transmitting or receiving signals. In this case, the BS 3 may prioritize the above type 1 over the above type 2 when allocating dedicated SR resources and scheduling data transmission. Alternatively, the information regarding the access category may indicate an access link (e.g., [WAN (LTE UL), Sidelink (D2D ProSe)]). The BS 3 may transmit configuration information regarding the second access for an access link (e.g., WAN or Sidelink (SL)) that the non-legacy UE 2 wishes.

(3) Information Regarding Access Purpose

The information regarding the access purpose may indicate an application/service type which is a type of an application or service that the non-legacy UE 2 intends (or desires) (e.g., [emergency alert, operator use/service, user application/service, . . . ]). The BS 3 may determine the configuration information regarding the second access (e.g., dedicated SR radio resources) in consideration of the priority or urgency of the application or service that the non-legacy UE 2 intends (or desires).

(4) Information Regarding Expected Data Amount

The information regarding the data amount may indicate an expected data amount (e.g., [x1 byte, x2 byte, . . . , variable]). The information regarding the data amount may indicate an expected transport block (TB) size (expected TB size) (e.g., [y1 byte, y2 byte, . . . , unfixed]). The BS 3 may determine the configuration information regarding the second access (e.g., radio parameter used in data transmission) so as to satisfy the above expected data mount or the expected transport block size.

(5) Information Regarding a Frequency of Occurrence of Communication in Accordance with the Second TTI This information may indicate an expected frequency (e.g., [low, medium, high, very high, irregular]) of occurrence of communication in accordance with the second TTI (or requiring the second TTI) performed by the non-legacy UE 2. This information may indicate an expected interval (e.g., [5 ms, 10 ms, 20 ms, 50 ms, 100 ms, . . . , unpredictable]) of communication performed by the non-legacy UE 2. The BS 3 may determine the duration of dedicated SR radio resources to be allocated to the non-legacy UE in such a way that the higher the frequency of occurrence (or the shorter the interval), the shorter the duration of the dedicated SR radio resources becomes.

(6) Information Regarding a Moving Speed

This information may indicate an expected moving speed of the non-legacy UE 2 (e.g., [xx km/h]). This information may indicate an expected mobility level (e.g., [low, medium, high, very high, none (no mobility)]) of the non-legacy UE 2. The BS 3 may determine the configuration information regarding the second access in such a way that the higher the mobility level (or the moving speed) of the non-legacy UE 2, the higher the probability of succeeding the data transmission becomes. For example, the BS 3 may determine the duration of dedicated SR radio resources to be allocated to the non-legacy UE in such a way that the higher the mobility (or the moving speed) of the non-legacy UE 2, the shorter the duration of the dedicated SR radio resources becomes.

On the other hand, the configuration information regarding the second access transmitted from the BS 3 to the non-legacy UE 2 may be any one or any combination of the following information items (1) to (4).

(1) SR Dedicated Radio Resource Assignment Information (D-SR Configuration for Low Latency Access)

The BS 3 may allocate dedicated SR radio resources for the second access which are different from dedicated SR radio resources for the first access (normal access). As described above, the dedicated SR radio resources for the second access may be set to a shorter length (duration) than that for the first access.

(2) TTI Configuration Information (TTI Configuration for Low Latency Access)

The TTI configuration information may indicate a TTI length (e.g., [0.25 ms, 0.5 ms, 0.75 ms, 1 ms]) which the second access should be performed in accordance with. That is, the value specified by the TTI configuration may correspond to the duration of the plurality of time-frequency resources used for data transmission via the second access.

(3) Radio Parameter Information for Data Transmission (Pre-Configured Radio Parameters for Low Latency Access)

The radio parameter information may include Modulation and Coding Scheme (MCS) index, Truncated MCS index, or Truncated MCS set. The radio parameter may include a set of resource blocks assigned for the second access (set of assigned for low latency access) or assignment information (resource block assignment) of radio resources for data transmission via the second access. The radio parameter(s) may be set separately for UL and DL or may be common to UL and DL. Interpretation (recognition) of radio parameter(s) contained in this information may be appropriately changed by the above TTI configuration.

(4) Layer 2 (L2) parameter information regarding data transmission (pre-configured L2 parameters for low latency access)

The L2 parameter information may indicate hybrid automatic repeat request (HARQ) on/off, ARQ on/off, or U-plane security on/off. The L2 parameter(s) may be set separately for UL and DL or may be common to UL and DL.

Figure 9:
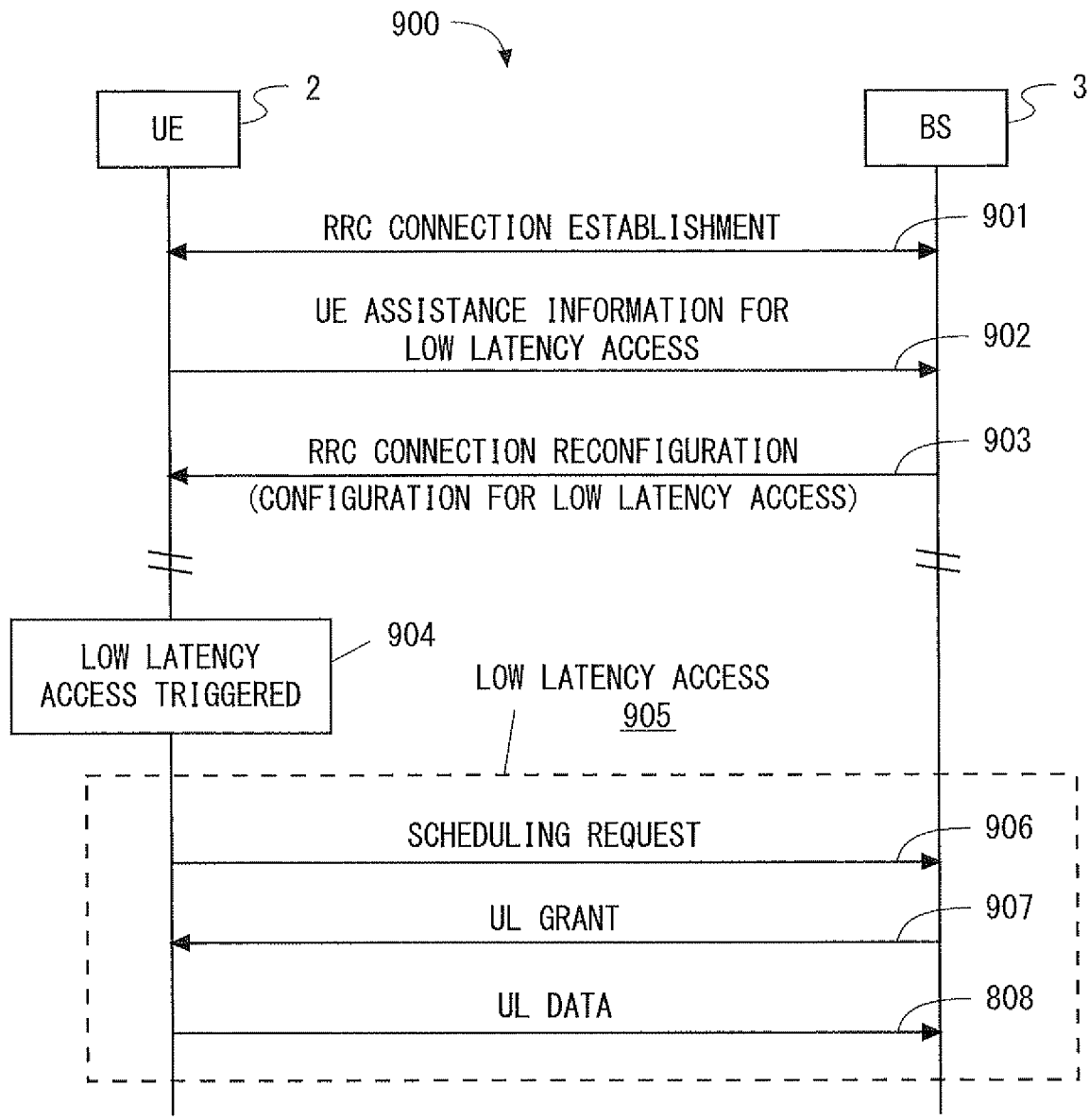
FIG. 9 is a sequence diagram showing an example of a communication procedure of second access according to the first embodiment.

FIG. 9 is a sequence diagram showing an example (process 900) of a communication procedure of the second access according to this embodiment. In block 901, the non-legacy UE 2 establishes a radio connection with the BS 3 (RRC Connection Establishment). In block 902, the non-legacy UE 2 transmits the UE assistance information (UE assistance information for low latency access) to the BS 3. The UE assistance information may be transmitted by a Signaling Radio Bearer (SRB), that is, in RRC signaling. The UE assistance information may be transmitted using, for example, an RRC Connection Setup Complete message during a procedure for establishing the radio connection in block 901.

In block 903, in response to the UE assistance information, the BS 3 transmits the configuration information regarding the second access (e.g., configuration for low latency access) to the non-legacy UE 2. The configuration information regarding the second access may be transmitted using an RRC message (e.g., RRC Connection Reconfiguration message). The non-legacy UE 2 stores the received configuration information regarding the second access and configures itself according to the received configuration.

In block 904, the non-legacy UE 2 is triggered to perform the second access (i.e., low latency access). For example, the non-legacy UE 2 is triggered to perform the second access by the presence of UL data requiring low latency. In block 905, the non-legacy UE 2 performs the second access (i.e., low latency access) with the BS 3. Specifically, as shown in FIG. 9, the non-legacy UE 2 transmits an SR to the BS 3 (906), receives a UL grant from the BS 3 (907), and transmits the UL data using the time-frequency resources specified by the UL grant. As described with reference to FIGS. 5 and 7, any one or all of the SR transmission (906), the UL grant transmission (907), and the UL data transmission (908) may be performed in accordance with the second access.

When the configuration information regarding the second access includes the radio parameter information for data transmission, the amount of control information to be transmitted by the UL grant is reduced, thereby shortening the time taken for the UE 2 to process the UL grant. Consequently, transmission of UL data can be started earlier than before. For example, when the configuration information regarding the second access includes (Truncated) MCS index, the information regarding the MCS transmitted on the existing (E)PDCCH may be deleted from the UL grant. Similarly, when the configuration information regarding the second access includes assignment information (resource block assignment) of radio resources for data transmission via the second access, the assignment information of the radio resources transmitted on the existing (E)PDCCH may be deleted. On the other hand, when the configuration information regarding the second access includes Truncated MCS set, the number of bits required for the information of MCS transmitted on the existing (E)PDCCH may be reduced. When the configuration information regarding the second access includes a set of radio resources to be allocated for the second access (e.g., set of resource blocks assigned for low latency access), the number of bits required for the assignment information of radio resources transmitted on the existing (E)PDCCH may be reduced.

Second Embodiment

This embodiment provides a modified example of the communication procedure of the second access described in the first embodiment. A configuration example of a radio communication system according to this embodiment is the same as that shown in FIG. 1. In this embodiment, the BS 3 is configured to receive network (NW) assistance information regarding the second access (e.g., Network (NW) assistance information for low latency access) from a higher network node (e.g., MME, Home Subscriber Server (HSS), Serving Gateway (S-GW), packet data network gateway (P-GW), or application server). The higher network node is configured to send the NW assistance information to the BS 3.

In some implementations, the higher network node may send the NW assistance information to the BS 3 in response to a service request (bearer establishment request) from the non-legacy UE 2. Alternatively, the higher network node may send the NW assistance information to the BS 3 when it sets an Initial Terminal Context (Initial UE Context) to the BS 3. Additionally or alternatively, when the content (or configuration) of the NW assistance information is updated (or changed), the higher network node may send the updated (or changed) NW assistance information to the BS 3.

In some implementations, the higher network node may send part or all of the UE assistance information received from the non-legacy UE 2 to the BS 3 as the NW assistance information. Alternatively, the NW assistance information may be information held in the higher network node or in the higher network, or may be information generated by the higher network node.

In some implementations, the higher network node may determine whether to allow the second access to the non-legacy UE 2 (or whether the authorization for the second access is given to the non-legacy UE 2), and send the NW assistance information to the BS 3 if the second access is allowed (or if authorization for the second access is given).

The BS 3 uses the NW assistance information instead of the UE assistance information described in the first embodiment. That is, the BS 3 may take into account the received NW assistance information when allocating, to the non-legacy UE 2, UL time-frequency resources (e.g., PUCCH resources) used for transmitting a scheduling request (SR) for the second access. Additionally or alternatively, the BS 3 may take into account the received NW assistance information when determining in advance the amount of time-frequency resources allocated by one UL grant for the second access. Additionally or alternatively, when determining whether to perform the second access with the non-legacy UE 2, the BS 3 may take into account the NW assistance information regarding this non-legacy UE 2.

In some implementations, in response to receiving the NW assistance information, the BS 3 may transmit the configuration information regarding the second access (e.g., configuration for low latency access) to the non-legacy UE 2. The configuration information may include assignment configuration of uplink radio resources (e.g., PUCCH resources) used to transmit a scheduling request (SR) for the second access.

A specific example of the NW assistance information according to this embodiment is the same as the UE assistance information described in the first embodiment. A specific example of the configuration information regarding the second access according to this embodiment is the same as the configuration information regarding the second access described in the first embodiment.

Figure 10:
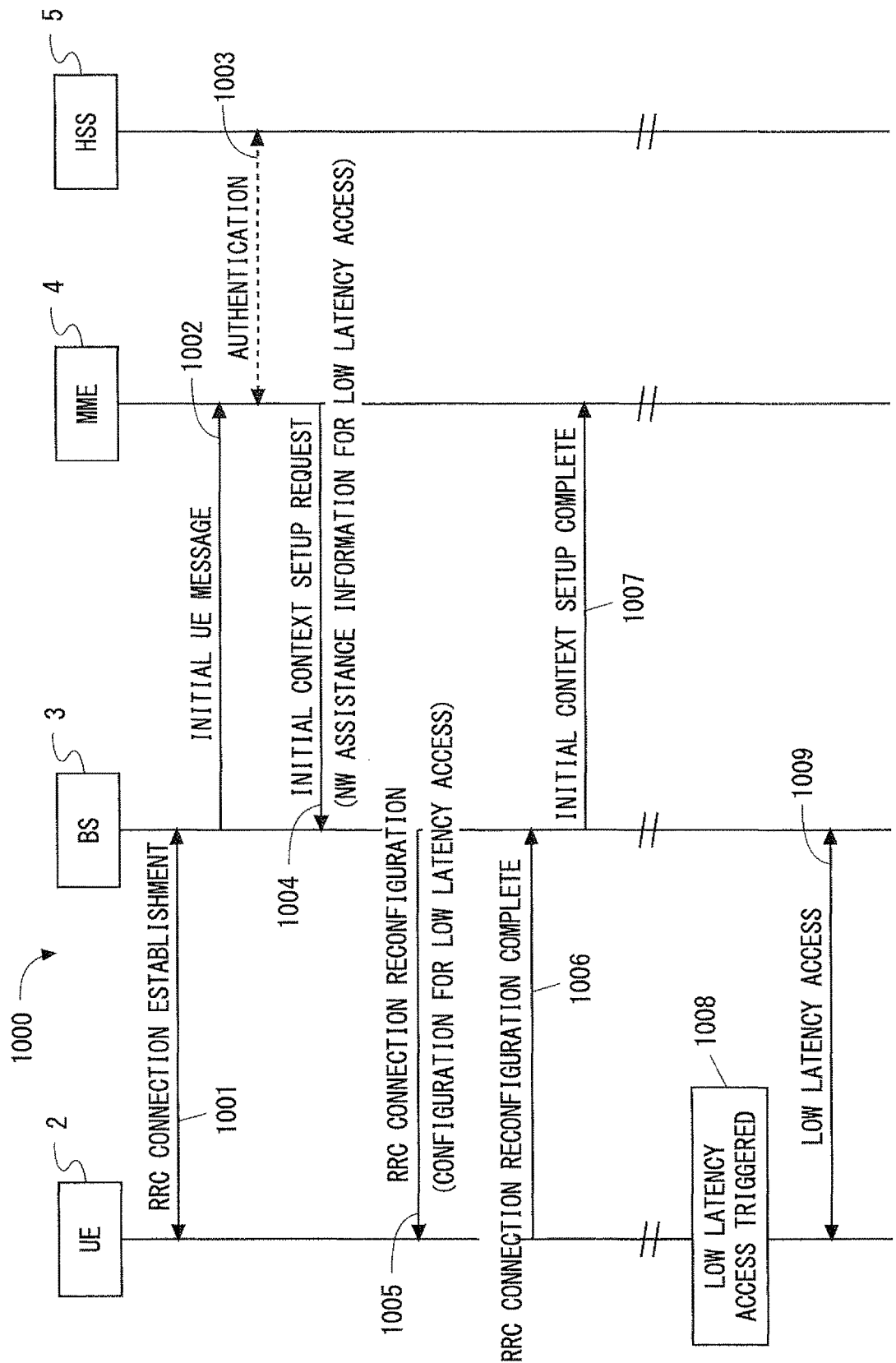
FIG. 10 is a sequence diagram showing an example of a communication procedure of second access according to a second embodiment.

FIG. 10 is a sequence diagram showing an example (process 1000) of the communication procedure of the second access according to this embodiment. In block 1001, the non-legacy UE 2 establishes a radio connection with the BS 3 (RRC Connection Establishment). In block 1002, the BS 3 forwards to the MME 4 a Non-Access Stratum (NAS) message (e.g., Attach Request, Service Request) received from the UE 2. The NAS message is transmitted using an RRC Connection Setup Complete message during the procedure for establishing a radio connection in block 1001. The NAS message is transferred from the BS 3 to the MME 4 using an S1AP Initial UE Message. The NAS message may include the UE assistance information described in the first embodiment.

The MME 4 may execute an authentication procedure for the UE 2 with the HSS 5 (1003). In the authentication procedure, the MME 4 may obtain the NW assistance information regarding the UE 2 from the HSS 5. In block 1004, the MME 4 sends the NW assistance information (NW assistance information for low latency access) to the BS 3. As shown in FIG. 10, the NW assistance information may be sent using an S1AP Initial Context Setup Request message.

In block 1005, in response to the NW assistance information, the BS 3 transmits the configuration information (configuration for low latency access) regarding the second access to the non-legacy UE 2. The configuration information regarding the second access may be transmitted using an RRC message (e.g., RRC Connection Reconfiguration message). The non-legacy UE 2 stores the received configuration information regarding the second access and configures itself according to the received configuration. In block 1006, the non-legacy UE 2 transmits a response (e.g., RRC Connection Reconfiguration Complete message) to the RRC message of block 1005. In block 1007, the BS 3 transmits a response (e.g., Initial Context Setup Complete message) to the S1AP message of block 1004.

The processing performed in blocks 1008 and 1009 is similar to the processing performed in blocks 904 and 905 shown in FIG. 9.

Third Embodiment

This embodiment provides a modified example of the communication procedure of the second access described in the first and second embodiments will be described. A configuration example of a radio communication system according to this embodiment is the same as that shown in FIG. 1. As already described above, the BS 3 may take into account the UE assistance information or the NW assistance information when it determines whether to perform the second access with the non-legacy UE 2. In this embodiment, the BS 3 is configured to determine whether to perform the second access with the non-legacy UE 2 based on the UE assistance information or the NW assistance information.

The condition for allowing the second access used in the determination by the BS 3 may be, for example, any one or any combination of the following conditions 1 to 3.

Condition 1: Data Transmission Requires the Second Access

The BS 3 may determine whether data transmission requires the second access based on the UE assistance information received from the non-legacy UE 2. Alternatively, the BS 3 may determine whether data transmission requires the second access based on the NW assistance information received from the higher network node (e.g., MME or application server).

Condition 2: The Second Access has been Previously Allowed (Or Authorization for the Second Access is Given) to the Non-Legacy UE 2

The higher network node (e.g., MME or application server) may notify the BS 3 whether the second access has been previously allowed by using the NW assistance information. The higher network node may recognize that the second access has been previously allowed when it is notified of the allowance (or authorization) of the second access by another network node (e.g., HSS or application server). Alternatively, to recognize that the second access has been previously allowed, the higher network node may determine whether the intended application or service is allowed (or authorized) to perform the second access in a contract operator or a connected radio network (e.g., registered PLMN).

Condition 3: The Second Access Corresponds to a Type that is Allowed in a Serving Cell to which the Non-Legacy UE 2 is Connected The BS 3 may determine whether the type of the second access requested (or desired) by the UE 2 corresponds to a type allowed in the serving cell based on the UE assistance information or the NW assistance information.

Figure 11:
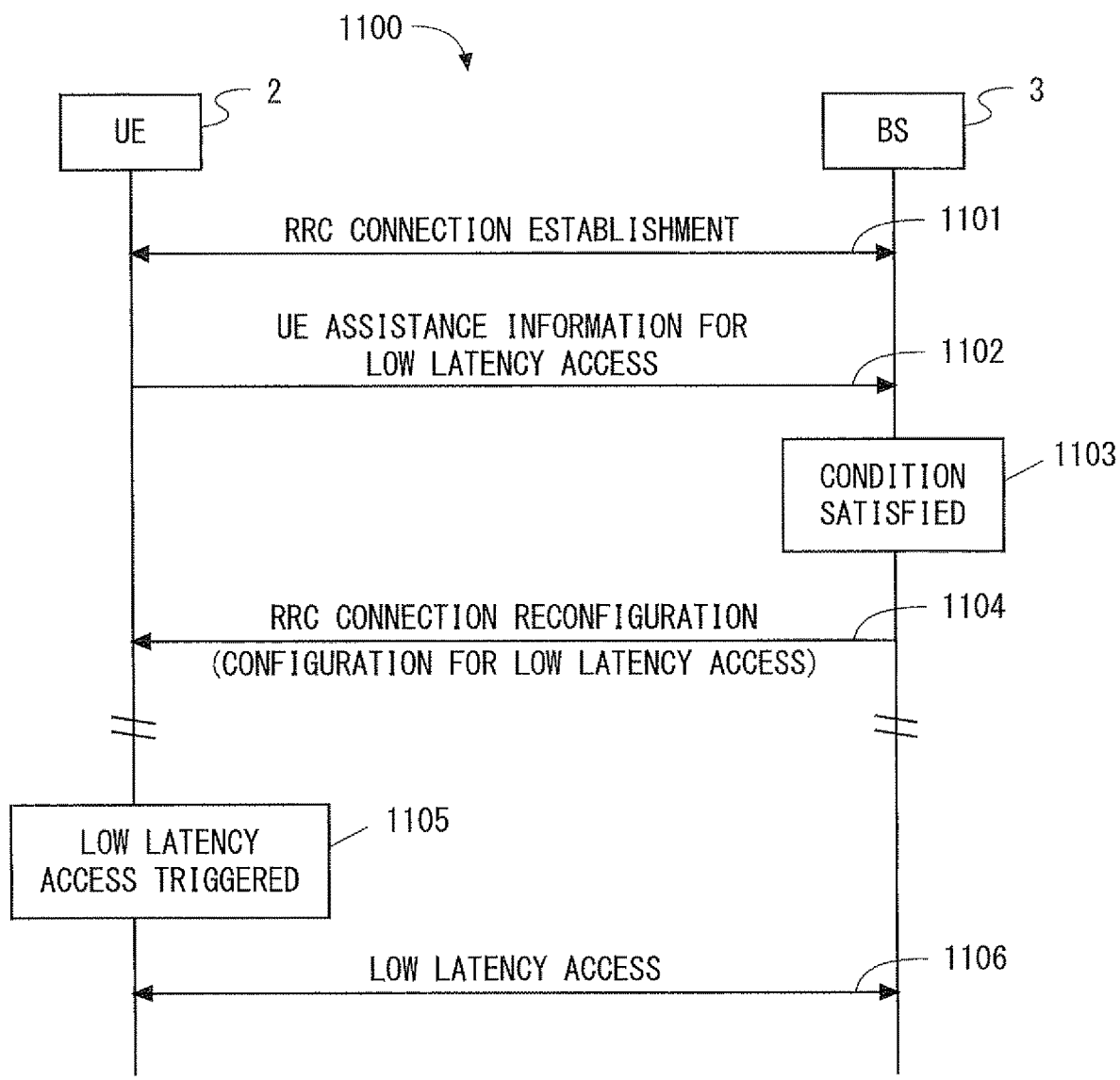
FIG. 11 is a sequence diagram showing an example of a communication procedure of the second access according to a third embodiment.

FIG. 11 is a sequence diagram showing an example (process 1100) of the communication procedure of the second access according to this embodiment. The processing performed in blocks 1101 and 1102 is the same as the processing performed in blocks 901 and 902 shown in FIG. 9. In block 1103, the BS 3 determines whether the non-legacy UE 2 satisfies the condition for allowing the second access based on the UE assistance information received from the non-legacy UE 2. If the condition is satisfied, the BS 3 transmits the configuration information regarding the second access to the UE 2 (1104). The processing performed in blocks 1104 to 1106 is the same as the processing performed in blocks 903 to 905 shown in FIG. 9.

Figure 12:
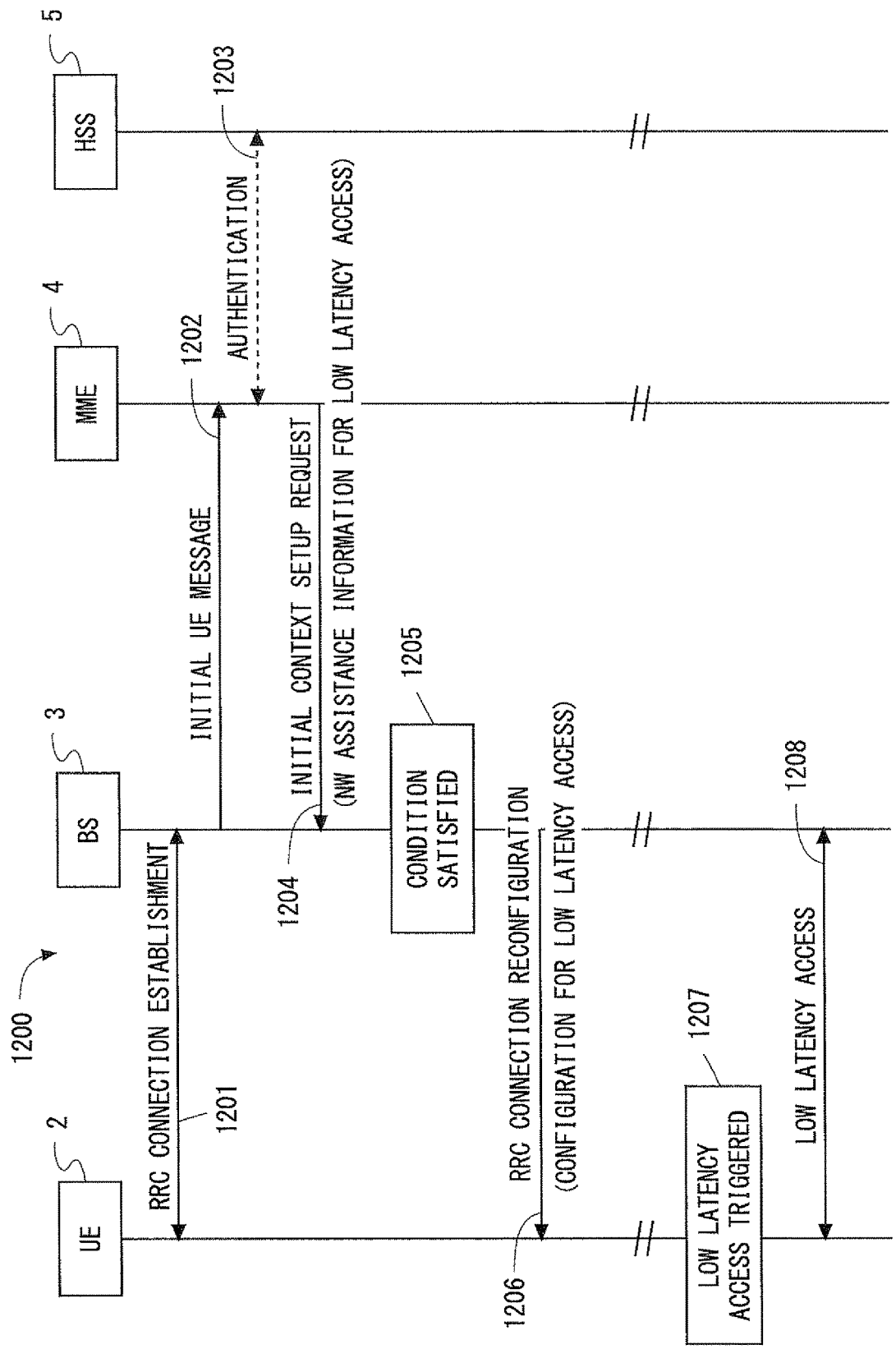
FIG. 12 is a sequence diagram showing an example of a communication procedure of the second access according to the third embodiment.

FIG. 12 is a sequence diagram showing an example (process 1200) of the communication procedure of the second access according to this embodiment. The processing performed in blocks 1201 to 1204 is the same as the processing performed in blocks 1001 to 1004 shown in FIG. 10. In block 1205, the BS 3 determines whether the non-legacy UE 2 satisfies the condition for allowing the second access based on the NW assistance information. When the condition is satisfied, the BS 3 transmits the configuration information regarding the second access to the UE 2 (1206). The processing performed in blocks 1206 to 1208 is similar to the processing performed in blocks 1005 to 1009 shown in FIG. 10.

As understood from the above description, in this embodiment, the BS 3 determines whether to allow the second access. Thus, for example, the BS 3 can control the non-legacy UE 2 to perform the second access only in situations where the second access is suitable. Therefore, it is possible to efficiently accommodate the non-legacy UE 2 performing the second access and the legacy UE 1 not performing the second access in the radio communication system.

The above embodiments provides the example in which the second access (i.e., low latency access) is performed by using a scheduling request (SR), a UL scheduling grant (UL grant), and a UL data transmission. However, the second access described in the above embodiment is not limited to this example. For example, to achieve low latency access, the second access may be performed in an implementation in which dedicated radio resources for UL data transmission via the second access are assigned in advance to the UE 2, and the UE 2 uses these radio resources as necessary. Alternatively, the second access may be performed in an implementation using contention-based access. In the contention-based access, the UL data transmission via the second access is performed using radio resources assigned in advance commonly to a plurality of radio terminals (UEs 2) in a cell. Further, the above-described embodiments and the above description may be applied not only to UL data transmission but also to DL data transmission.

Further, in the above-described embodiments, it is assumed that the first access and the second access are performed in the same cell. However, the embodiments can applied to cases where the first access and the second access are performed in different cells. For example, the UE 2 and the BS 3 may simultaneously use a first cell and a second cell by using Carrier Aggregation (CA), and the first and second access may be performed in the first and second cells, respectively. In this case, the assistance information regarding the second access and the configuration information regarding the second access may be transmitted through the first cell. The first and second cells may be configured as a primary cell (PCell) a secondary cell (SCell) for the UE 2, respectively. Furthermore, the first cell may be a cell using a conventional carrier (a Legacy Carrier), and the second cell may be a cell using a newly defined carrier (New Type Carrier).

Fourth Embodiment

This embodiment provides a modified example of the communication procedure of the second access described in the above embodiments. A configuration example of a radio communication system according to this embodiment is the same as that shown in FIG. 1.

In LTE-Advanced (3GPP Release 12), a Device-to-Device communication (or D2D communication, Direct communication) function for direct communication between UEs using an existing uplink frequency is defined. Further defined is a function of Direct discovery (D2D Discovery, Device discovery) in which a UE detects, as necessary, a UE or UEs which will be correspondents of the direct communication. These functions are sometimes collectively referred to as Proximity based Service (ProSe).

A direct interface between UEs for Direct communication and Direct discovery is referred to as a sidelink (SL) or a PC5 interface. As mentioned above, the sidelink uses the uplink frequency. Therefore, to perform ProSe, i.e., to perform the sidelink communication (at least one of Direct discovery and Direct communication), a UE needs to obtain information regarding radio resources used in the sidelink that corresponds to a part of the uplink radio resources in existing LTE.

In some implementations, a UE obtains SL control information in System information (e.g., SIB 18 for Direct communication, SIB 19 for Direct discovery). The System information includes information regarding common SL radio resources (Resource pool) that are commonly allocated to a plurality of UEs. A UE that has been allowed to perform ProSe selects radio resources from the common SL radio resources and performs the sidelink communication (i.e., at least one of Direct discovery and Direct communication).

In some implementations, a UE obtains the SL control information by dedicated signaling (e.g., RRC, MAC). In the dedicated signaling, common SL radio resources or dedicated SL radio resources (Dedicated resources) allocated in a dedicated manner (e.g., to each group) are transmitted from the eNB to the UE. When the UE receives the common SL radio resources by the dedicated signaling, the UE overwrites the information of the common SL radio resources transmitted by the System information. On the other hand, when the UE receives the dedicated SL radio resources by the dedicated signaling, the UE performs the sidelink communication using the dedicated SL radio resources. The information indicating the dedicated SL radio resources for Direct communication is also referred to as a sidelink grant (SL grant).

The scheme using the common SL radio resources is referred to as (UE) autonomous resource selection scheme, and the scheme using the dedicated SL radio resources is referred to as Scheduled resource allocation (by eNB) scheme.

The method and procedure for obtaining the SL control information for Direct discovery may differ from or be the same as the method and procedure for obtaining the SL control information for Direct communication.

Figure 13:
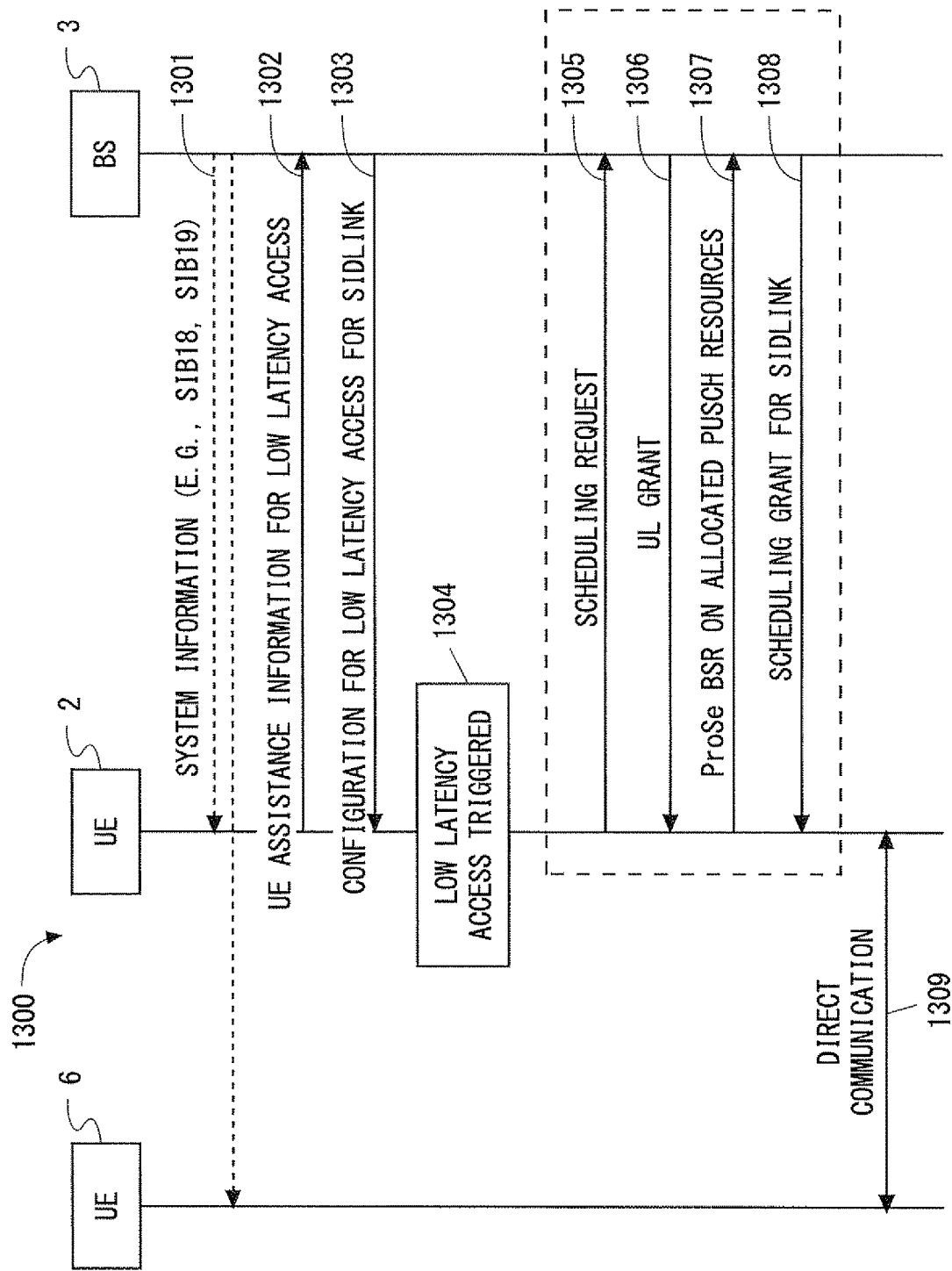
FIG. 13 is a sequence diagram showing an example of a communication procedure of the second access according to a fourth embodiment.

FIG. 13 is a diagram showing an example (process 1300) of a communication procedure according to this embodiment. In block 1301, the non-legacy UE 2 receives ProSe configuration from the BS 3 by SIB. In block 1302, the non-legacy UE 2 transmits UE assistance information to the BS 3. The UE assistance information indicates a request for Direct communication on SL. In block 1303, the BS 3 transmits configuration information for the second access (low latency access) on SL (e.g., configuration for low latency access for SL) to the non-legacy UE 2.

In block 1304, the non-legacy UE 2 is triggered to perform the sidelink communication requesting low latency. In block 1305, the non-legacy UE 2 transmits an SR to the BS 3. In block 1306, the non-legacy UE 2 receives a UL grant from the BS 3. In block 1307, the non-legacy UE 2 transmits a ProSe BSR using the allocated UL resources (PUSCH) to request resource allocation for Direct communication. In block 1308, the non-legacy UE 2 receives from the BS 3 a scheduling grant indicating resource allocation for the side-link communication (Direct communication). In block 1309, the UE 2 performs Direct communication with the UE 6 using the radio resources allocated from the BS 3.

At least a part of the transmission and reception in blocks 1305 to 1308 may be performed via the second access described in the above embodiments. For example, the UL data transmission in block 1307 may be performed via the second access in accordance with the second TTI. Further, the SR in block 1305 may be transmitted in a format or at a timing defined for the second access (i.e., low latency access).

Figure 14:
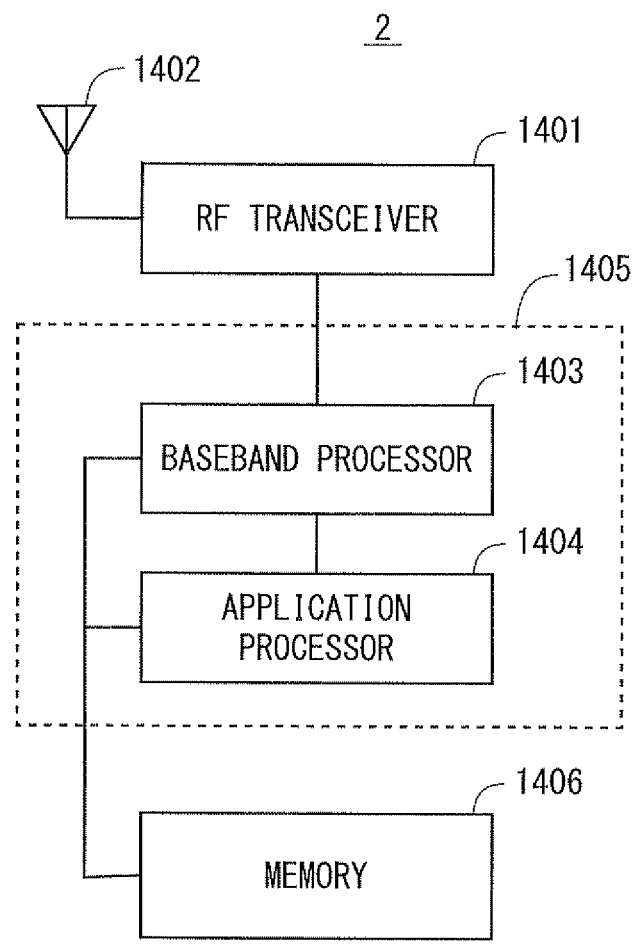
FIG. 14 is a block diagram showing a configuration example of a non-legacy UE according to some embodiments.

Lastly, configuration examples of the non-legacy UE 2, the BS 3, and the higher network node (e.g., MME 4) according to the above-described embodiments will be described. FIG. 14 is block diagram showing a configuration example of the non-legacy UE 2. A Radio Frequency (RF) transceiver 1401 performs analog RF signal processing to communicate with the BS 3. The RF transceiver 1401 may also be used for the sidelink communication (i.e., Direct discovery and Direct communication) with other UEs. The RF transceiver 1401 may include a first transceiver used for communication with the BS 3 and a second transceiver used for sidelink communication with other UEs. The analog RF signal processing performed by the RF transceiver 1401 includes frequency up-conversion, frequency down-conversion, and amplification. The RF transceiver 1401 is coupled to an antenna 1402 and a baseband processor 1403. That is, the RF transceiver 1401 receives modulated symbol data (or OFDM symbol data) from the baseband processor 1403, generates a transmission RF signal, and supplies the transmission RF signal to the antenna 1402. Moreover, the RF transceiver 1401 generates a baseband reception signal based on a reception RF signal received by the antenna 1402, and supplies the baseband reception signal to the baseband processor 1403.

The baseband processor 1403 performs digital baseband signal processing (i.e., data plane processing) and control plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, (f) generation of OFDM symbol data (baseband OFDM signal) by Inverse Fast Fourier Transform (IFFT). On the other hand, the control plane processing includes communication management of layer 1 (e.g., transmission power control), layer 2 (e.g., radio resource management and hybrid automatic repeat request (HARQ) processing), and layer 3 (e.g., signaling relating to attach, mobility, and call management).

For example, in the case of LTE and LTE-Advanced, the digital baseband signal processing performed by the baseband processor 1403 may include signal processing of the Packet Data Convergence Protocol (PDCP) layer, the RLC layer, the MAC layer, and the PHY layer. Further, the control plane processing performed by the baseband processor 1403 may include processing of the NAS protocol and the RRC protocol.

The baseband processor 1403 may include a modem processor (e.g., Digital Signal Processor (DSP)) that performs the digital baseband signal processing and a protocol stack processor (e.g., Central Processing Unit (CPU) or Micro Processing Unit (MPU)) that performs the control plane processing. In this case, the protocol stack processor, which performs the control plane processing, may be integrated with an application processor 1404 described in the following.

The application processor 1404 is also referred to as a CPU, an MPU, a microprocessor, or a processor core. The application processor 1404 may include a plurality of processors (processor cores). The application processor 1404 loads a system software program (Operating System (OS)) and various application programs (e.g., a call application, a WEB browser, a mailer, a camera operation application, a music player application) from a memory 1406 or a memory (not shown) and executes these programs, thereby providing various functions of the non-legacy UE 2.

In some implementations, as represented by a dashed line (1405) in FIG. 14, the baseband processor 1403 and the application processor 1404 may be integrated on a single chip. In other words, the baseband processor 1403 and the application processor 1404 may be implemented in a single System on Chip (SoC) device 1405. A SoC device may also be referred to as a system Large Scale Integration (LSI) or a chipset.

The memory 1406 is a volatile memory or a non-volatile memory or a combination thereof. The memory 1406 may include a plurality of memory devices that are physically independent from each other. The volatile memory is, for example, a Static Random Access Memory (SRAM), a Dynamic RAM (DRAM) or a combination thereof. The non-volatile memory may be a Mask Read Only Memory (MROM), an Electrically Erasable Programmable ROM (EEPROM), a flash memory, a hard disk drive, or any combination thereof. For example, the memory 1406 may include an external memory device accessible from the baseband processor 1403, the application processor 1404, and the SoC 1405. The memory 1406 may include a built-in memory device that is integrated within the baseband processor 1403, the application processor 1404, or the SoC 1405. The memory 1406 may include a memory in a Universal Integrated Circuit Card (UICC).

The memory 1406 may store a software module(s) (computer program(s)) including instructions and data necessary for performing the processing of the non-legacy UE 2 described in the above embodiments. In some implementations, the baseband processor 1403 or the application processor 1404 may be configured to load this software module(s) from the memory 1406 and execute it and thereby perform the processing of the non-legacy UE 2 described in the above embodiments.

Figure 15:
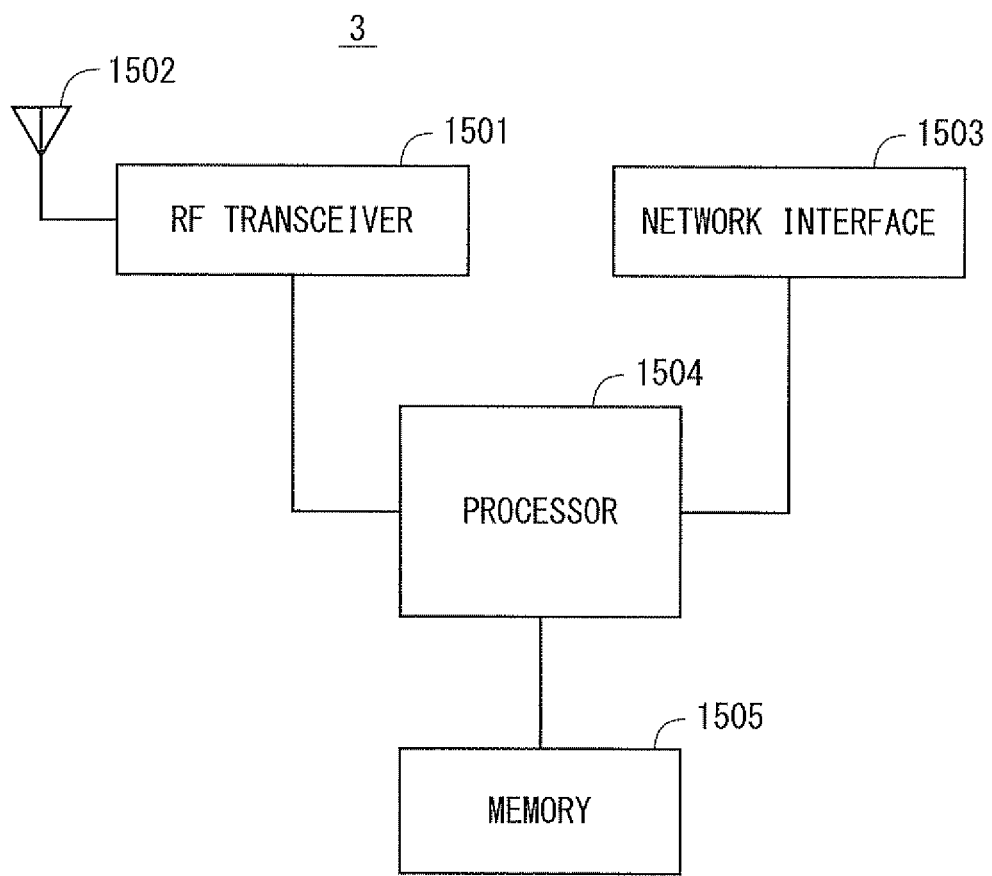
FIG. 15 is a block diagram showing a configuration example of a radio base station according to some embodiments.

FIG. 15 is a block diagram showing a configuration example of the BS 3 according to the above embodiments. Referring to FIG. 15, the BS 3 includes an RF transceiver 1501, a network interface 1503, a processor 1504, and a memory 1505. The RF transceiver 1501 performs analog RF signal processing to communicate with the legacy UE 1 and the non-legacy UE 2. The RF transceiver 1501 may include a plurality of transceivers. The RF transceiver 1501 is coupled to an antenna 1502 and a processor 1504. The RF transceiver 1501 receives modulated symbol data (or OFDM symbol data) from the processor 1504, generates a transmission RF signal, and supplies the transmission RF signal to the antenna 1502. Further, the RF transceiver 1501 generates a baseband reception signal based on a reception RF signal received by the antenna 1502, and supplies the baseband reception signal to the processor 1504.

The network interface 1503 is used to communicate with network nodes (e.g., MME and S/P-GW). The network interface 1503 may include, for example, a network interface card (NIC) conforming to the IEEE 802.3 series.

The processor 1504 performs digital baseband signal processing (i.e., data plane processing) and control plane processing for radio communication. For example, in the case of LTE and LTE-Advanced, the digital baseband signal processing performed by the processor 1504 may include signal processing of the PDCP layer, the RLC layer, the MAC layer, and the PHY layer. The control plane processing performed by the processor 1504 may include processing of the S1 protocol and the RRC protocol.

The processor 1504 may include a plurality of processors. For example, the processor 1504 may include a modem processor (e.g., DSP) that performs the digital baseband signal processing and a protocol stack processor (e.g., CPU or MPU) that performs the control plane processing.

The memory 1505 is composed of a combination of a volatile memory and a non-volatile memory. The volatile memory is, for example, an SRAM, a DRAM, or a combination thereof. The non-volatile memory is, for example, an MROM, a PROM, a flash memory, a hard disk drive, or any combination thereof. The memory 1505 may include a storage that is disposed separately from the processor 1504. In this case, the processor 1504 may access the memory 1505 via the network interface 1503 or an I/O interface (not shown).

The memory 1505 may store a software module(s) (computer program(s)) including instructions and data necessary for performing the processing of the BS 3 described in the above embodiments. In some implementations, the processor 1504 may be configured to load this software module(s) from the memory 1505 and execute it and thereby perform the processing of the BS 3 described in the above embodiments.

Figure 16:
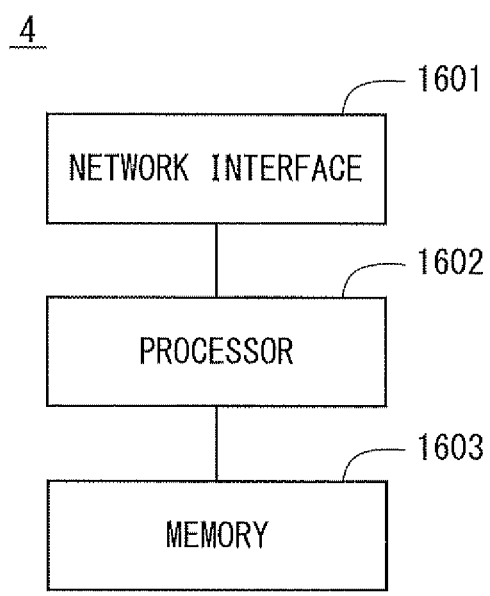
FIG. 16 is a block diagram showing a configuration example of an MME according to some embodiments.

FIG. 16 is a block diagram showing a configuration example of the MME 4 according to the above embodiments. Referring to FIG. 16, the MME 4 includes a network interface 1601, a processor 1602, and a memory 1603. The network interface 1601 is used to communicate with network nodes (e.g., BS 3, HSS 5, and S/P-GW). The network interface 1601 may include, for example, a network interface card (NIC) conforming to the IEEE 802.3 series.

The processor 1602 performs the processing of the MME 4 described in the above embodiments by reading and executing software from the memory 1603. The processor 1602 may be, for example, a microprocessor, an MPU, or a CPU. The processor 1602 may include a plurality of processors.

The memory 1603 is composed of a combination of a volatile memory and a non-volatile memory. The memory 1603 may include a storage disposed separately from the processor 1602. In this case, the processor 1602 may access the memory 1603 via or an I/O interface (not shown).

As described with reference to FIGS. 14 to 16, each of the processors included in the non-legacy UE 2, the BS 3, and the higher network node (e.g., MME 4) according to the above-described embodiments executes one or more programs including instructions for causing a computer to execute the algorithm described with reference to the drawings. This program(s) can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, semiconductor memories (such as Mask ROM, Programmable ROM (PROM), Erasable PROM (EPROM), flash ROM, Random Access Memory (RAM)). This program(s) may be provided to a computer using any type of transitory computer readable media. Examples of transitory computer readable media include electric signals, optical signals, and electromagnetic waves. Transitory computer readable media can provide the program(s) to a computer via a wired communication line (e.g. electric wires, and optical fibers) or a wireless communication line.

OTHER EMBODIMENTS

The above embodiments may be implemented individually or in any combination.

Further, the above-described embodiments are merely examples of applications of the technical ideas obtained by the inventor. These technical ideas are not limited to the above-described embodiments, and various modifications may be made as a matter of course.

REFERENCE SIGNS LIST

1 LEGACY UE
2 NON-LEGACY UE
3 RADIO BASE STATION
31 CELL
1401 RF TRANSCEIVER
1403 BASEBAND PROCESSOR
1501 RF TRANSCEIVER
1504 PROCESSOR

The invention claimed is:

1. A radio station comprising:
at least one radio transceiver; and
at least one processor coupled to the at least one radio transceiver, wherein
the at least one processor is configured to perform, with at least one radio terminal, first radio communication in accordance with a first transmission time interval (TTI) and second radio communication in accordance with a second TTI,
the first TTI is equal to a duration of one subframe,
the second TTI is shorter than the duration of the subframe, and
the at least one processor is configured to receive assistance information regarding the second radio communication from a first radio terminal capable of performing the second radio communication among the at least one radio terminal or from a higher network node,
wherein the assistance information includes information regarding at least one of: an expected latency time when the first radio terminal performs the second radio communication; an allowable latency time when the first radio terminal performs the second radio communication; and an expected number of occurrences of the second radio communication.

2. The radio station according to claim 1, wherein the assistance information is transmitted from the first radio terminal to the radio station in response to one of: establishment of a radio connection between the radio station and the first radio terminal; reception of a request from the radio station; and update of the assistance information.

3. The radio station according to claim 1, wherein the assistance information is transmitted from the higher network node to the radio station in response to one of: a service request from the at least one radio terminal; setting of an initial terminal context; and update of the assistance information.

4. The radio station according to claim 1, wherein the at least one processor is configured to transmit configuration information regarding the second radio communication to the first radio terminal in response to the reception of the assistance information.

5. The radio station according to claim 4, wherein the configuration information includes at least one of: assignment information of an uplink radio resource used to transmit a scheduling request for the second radio communication; TTI configuration information; radio parameter information for data transmission via the second radio communication; and layer 2 parameter information for data transmission via the second radio communication.

6. The radio station according to claim 1, wherein the at least one processor is configured to take into account the assistance information when determining whether to perform the second radio communication with the first radio terminal.

7. The radio station according to claim 1, wherein the assistance information further includes at least one of: capability information indicating presence or absence of capability of performing the second radio communication; an access purpose indicating whether the second radio communication is required; information indicating an intended application or service; and information indicating a moving speed.

8. The radio station according to claim 1, wherein the at least one processor is configured to perform the first and second radio communication with different radio terminals.

9. The radio station according to claim 1, wherein the at least one processor is configured to perform the first and second radio communication with the same radio terminal.

10. The radio station according to claim 1, wherein the at least one processor is configured to allocate a first plurality of time-frequency resources to the at least one radio terminal for the first radio communication and allocate a second plurality of time-frequency resources to the at least one radio terminal for the second radio communication.

11. The radio station according to claim 10, wherein
the first plurality of time-frequency resources are used to transmit or receive a first transport block and first error detection bits added thereto in accordance with the first TTI,
the whole of the first transport block is used to calculate the first error detection bits, and the first error detection bits are added to the first transport block, and
a duration of the first plurality of time-frequency resources corresponds to the duration of the subframe,
the second plurality of time-frequency resources are used to transmit or receive a second transport block and second error detection bits added thereto in accordance with the second TTI,
the whole of the second transport block is used to calculate the second error detection bits, and the second error detection bits are added to the second transport block, and
a duration of the second plurality of time-frequency resources is shorter than the duration of the subframe.

12. The radio station according to claim 10, wherein the subframe is composed of a plurality of time slots,
each of the plurality of time slots includes a plurality of time-frequency resources, the second TTI is equal to a duration of at least one of the plurality of time slots, and the duration of the second plurality of time-frequency resources corresponds to the second TTI.

13. A radio terminal apparatus comprising:
at least one radio transceiver configured to communicate with a radio station; and
at least one processor coupled to the at least one radio transceiver, wherein
the at least one processor is configured to perform both first radio communication in accordance with a first transmission time interval (TTI) that is equal to a duration of a subframe and second radio communication in accordance with a second TTI that is shorter than the first TTI or to perform the second radio communication, the first TTI being equal to a duration of a subframe, and
the at least one processor is configured to transmit assistance information regarding the second radio communication to the radio station;
wherein the assistance information includes information regarding at least one of: an expected latency time when the radio terminal apparatus performs the second radio communication; an allowable latency time when the radio terminal apparatus performs the second radio communication; and an expected number of occurrences of the second radio communication.

14. The radio terminal apparatus according to claim 13, wherein the at least one processor is configured to transmit the assistance information in response to one of: establishment of a radio connection between the radio station and the radio terminal apparatus; reception of a request from the radio station; and update of the assistance information.

15. The radio terminal apparatus according to claim 13, wherein the at least one processor is configured to receive configuration information regarding the second radio communication as a response to the transmission of the assistance information.

16. The radio terminal apparatus according to claim 15, wherein the configuration information includes at least one of: assignment information of an uplink radio resource used to transmit a scheduling request for the second radio communication; TTI configuration information; radio parameter information for data transmission via the second radio communication; and layer 2 parameter information for data transmission via the second radio communication.

17. The radio terminal apparatus according to claim 13, wherein the assistance information is taken into account by the radio station when the radio station determines whether to perform the second radio communication with the radio terminal apparatus.

18. A method performed by a radio station configured to perform, with at least one radio terminal, first radio communication in accordance with a first transmission time interval (TTI) and second radio communication in accordance with a second TTI, the first TTI being equal to a duration of one subframe, the second TTI being shorter than the duration of the subframe, the method comprising:
receiving assistance information regarding the second radio communication from a first radio terminal capable of performing the second radio communication among the at least one radio terminal or from a higher network node,
wherein the assistance information includes information regarding at least one of: an expected latency time when the first radio terminal performs the second radio communication; an allowable latency time when the first radio terminal performs the second radio communication; and number of occurrences of the second radio communication.

19. The method of claim 18, further comprising:
receiving a scheduling request from the first radio terminal after receiving the assistance information;
sending the first radio terminal an uplink grant in response to the scheduling request and based on the assistance information; and
receiving the second radio communication from the first radio terminal based on the uplink grant, wherein the second radio communication includes uplink data, and wherein the uplink data requires the second TTI.

20. The method of claim 18, further comprising:
receiving a first scheduling request from the first radio terminal after receiving the assistance information;
sending the first radio terminal an uplink grant in response to the first scheduling request and based on the assistance information;
receiving a second scheduling request from the first radio terminal after sending the uplink grant, wherein the second scheduling request is associated with sidelink communications; and
sending the first radio terminal a scheduling grant for the sidelink communications.

* * * * *